(12) United States Patent
Vishnoi et al.

(10) Patent No.: US 11,573,973 B1
(45) Date of Patent: Feb. 7, 2023

(54) METHODS AND SYSTEMS FOR THE EXECUTION OF ANALYSIS AND/OR SERVICES AGAINST MULTIPLE DATA SOURCES WHILE MAINTAINING ISOLATION OF ORIGINAL DATA SOURCE

(71) Applicants: Vivek Vishnoi, Cupertino, CA (US); Steven Sanghoon Lee, Sunnyvale, CA (US)

(72) Inventors: Vivek Vishnoi, Cupertino, CA (US); Steven Sanghoon Lee, Sunnyvale, CA (US)

( * ) Notice: Subject to any disclaimer, the term of this patent is extended or adjusted under 35 U.S.C. 154(b) by 336 days.

(21) Appl. No.: 16/720,473

(22) Filed: Dec. 19, 2019

Related U.S. Application Data

(60) Provisional application No. 62/782,297, filed on Dec. 19, 2018.

(51) Int. Cl.
| | |
|---|---|
| *G06F 9/54* | (2006.01) |
| *G06F 16/25* | (2019.01) |
| *H04L 12/66* | (2006.01) |
| *G06F 16/23* | (2019.01) |

(52) U.S. Cl.
CPC ............ *G06F 16/254* (2019.01); *G06F 9/54* (2013.01); *G06F 16/2379* (2019.01); *H04L 12/66* (2013.01)

(58) Field of Classification Search
CPC ...... G06F 16/254; G06F 16/2379; G06F 9/54; H04L 12/66
See application file for complete search history.

(56) References Cited

U.S. PATENT DOCUMENTS

| | | | |
|---|---|---|---|
| 9,823,865 B1* | 11/2017 | Natanzon ............ | G06F 11/1451 |
| 2013/0227303 A1* | 8/2013 | Kadatch .............. | G06F 21/6218 713/193 |
| 2013/0238785 A1* | 9/2013 | Hawk ................... | G06F 9/5077 709/224 |
| 2013/0246802 A1* | 9/2013 | Kerschbaum ......... | H04L 9/0643 713/189 |
| 2016/0092254 A1* | 3/2016 | Borra ..................... | G06Q 20/14 718/1 |
| 2017/0116084 A1* | 4/2017 | Liu ..................... | G06F 11/2025 |

FOREIGN PATENT DOCUMENTS

WO  WO-2018201009 A1 * 11/2018 ......... G06F 21/6254

* cited by examiner

*Primary Examiner* — Hicham Skhoun
(74) *Attorney, Agent, or Firm* — Andy T. Pho

(57) ABSTRACT

Methods and systems for data are disclosed. A system implementation includes a data module for storing data received from an external source. The data module includes a file system for unstructured data, a database for structured data, a transform for operating upon unstructured or structured data, a data broker for receiving data having a first format and providing the data in a second format, a data network for communications within the data module, and a processing module for performing operations upon data. The processing module further includes a process broker and a process container. The process container is for providing one or more instances of processes during a runtime operation. The system further includes an inter-process network for communications within the processing module and an internal gateway for the data module to communicate with the processing module.

20 Claims, 24 Drawing Sheets

METHODS AND SYSTEMS FOR THE EXECUTION OF ANALYSIS AND/OR SERVICES AGAINST MULTIPLE DATA SOURCES WHILE MAINTAINING ISOLATION OF ORIGINAL DATA SOURCE

CROSS REFERENCE TO RELATED APPLICATIONS

This application claims the benefit of U.S. Provisional Patent Application No. 62/782,297, entitled "METHODS AND SYSTEMS FOR THE EXECUTION OF ANALYSIS AND/OR SERVICES AGAINST MULTIPLE DATA SOURCES WHILE MAINTAINING ISOLATION OF ORIGINAL DATA SOURCE," filed Dec. 19, 2018, the disclosure of which is incorporated by reference herein in its entirety.

FIELD

The present disclosure relates to data services.

BACKGROUND

Across the global economy, enterprises have come to the realization that leveraging their data is critical to surviving and prospering in an increasingly digital world. Big data can be used to drive productivity, enhance existing revenue, and even create entire new lines of business, based on new business models. Research tells us that enterprises that leverage customer behavioral data outperform peers by 85 percent in sales growth and more than 25 percent in gross margin. The use of data must be seen as strategic.

SUMMARY

Methods and systems for the execution of analysis and/or services against multiple data sources while maintaining isolation of original data source are provided.

In an example embodiment, a system implementation includes a data module for storing data received from an external source. The data module includes a file system for unstructured data, a database for structured data, a transform for operating upon unstructured or structured data, a data broker for receiving data having a first format and providing the data in a second format, a data network for communications within the data module, and a processing module for performing operations upon data. The processing module further includes a process broker and a process container. The process container is for providing one or more instances of processes during a runtime operation. The system further includes an inter-process network for communications within the processing module and an internal gateway for the data module to communicate with the processing module.

According to an aspect, a system includes an external gateway coupled to the data module. The external gateway is configured for receiving data from an external source. The system includes one or more isolated-type data-network configured for allowing communications between elements of the data module, a process network for allowing communications between elements of the process module, and a filter for filtering results output by the process module.

According to an aspect, the system includes a virtual machine implementation, and a container implementation. The container implementation comprises a building block for instantiating one or more system elements. The system elements include one or more of: a gateway, a router, a firewall, an isolated network, a subnet, a proxy, a network protocol element, a process module, a transform, a file system, a database, a broker, or a filter. One or more data modules and one or more process modules are isolated from each other by using one or more gateways and one or more networks. The network elements include: a router, a router subnet, a component subnet. The router may be implemented by using a container implementation.

According to an aspect, the isolation provided by the system is a result of the instantiation and/or configuration of, one or more isolated-type virtual network segments, one or more containers and/or more one or more subnets. The system is configured for on-demand and/or dynamic instantiation and/or destruction of one or more modules and/or submodules, thereby having a smaller attack window such that the system and/or data for the system are only accessible during a small time window after instantiation and before destruction of the system.

According to an aspect, a configurator for the system only keeps a record of a system-instantiation recipe for the instantiation and/or destruction of the instantiation of the system, such that a system instantiation is selectively replicated and/or iterated even after the system is no longer instantiated or has been destroyed. The system-instantiation recipe has a set of instructions allowing for the replication of a specific set of previously generated results without actually storing the previously generated results.

In an example embodiment, a method of isolating data receives from a first entity, a first data set, stores the first data set by using a first data module, provides by using an internal gateway the first data set to a first process module, processes the first data set by using the first process module thereby generating a second data set. The second data set includes the result of processing the first data set. The method provides by using the internal gateway the second data set to a second data module, and the internal gateway is required for communication between the first data module and the first process module.

According to an aspect, a method communicates within the first data module by using a first data network; and prevents by using the first data network, communication between objects internal to the first data network and objects external to the first data network. The method uses an external gateway for the receiving from the first entity, provides by using the external gateway the first data set to a second entity, such that the first entity and the second entity are not required to be simultaneously coupled to the external gateway at any particular point in time.

According to an aspect, a method provides the first data set to a second entity without the need for the first entity and the second entity to be coupled directly to each other. The method receives the first data set in real-time. Alternatively, the method receives the first data set off-line and/or in batch mode.

According to an aspect, a method by using a container implementation within a virtual machine, instantiates one or more of: a gateway, a router, a firewall, an isolated network, a subnet, a proxy, a network protocol element, a process module, a transform, a file system, a database, a broker, or a filter. One or more data modules and one or more process modules are isolated from each other by using one or more gateways and one or more networks. The networks include several network elements such as a router, a router subnet, a component subnet, and the router is implemented by using a container implementation. The isolated network and/or the isolation is provided and/or performed by using one or more containers and/or one or more subnets.

According to an aspect, the method provides to a user, an element of the second data set, the first entity has different access to the second data set than to the first data set thereby providing isolated data for the second data set, and the processing is performed outside the view and/or access of the first entity thereby providing isolated processing. The processing sometimes includes transforming the data by using one or more of an executable application, a function, a gateway, a router, a firewall, an isolated network, a subnet, a proxy, a network protocol element, a process module, a transform, a sort, a file system, a database, a broker, a filter, an HTTP Interceptor, FTP Interceptor, AQMP Interceptor, Socket Proxy Container, JDBC Proxy, Firewall, API Gateway, JMS Interceptor, MQTT Interceptor, CIFS Proxy.

According to an aspect, a method stores the first data set by using a first data module, and analyzes the first data set. The first data set has a first data element, which has a first feature that is useable to identify an entity associated with the first data element. The first data element includes personally identifiable information, including one or more of: name, address, an identification number, an attribute, trait, or characteristic associated with an entity. The method separates a first feature from a first data element such that the first feature is not useable to identify an entity associated with the first data element. The analyzing may include a mosaic effect analysis, and the processing includes one or more steps such as storing, retrieving, analyzing, filtering, sorting, transforming, and/or anonymizing.

According to an example embodiment, a method of processing data receives a first data set from a first source, receives, independently of the first source, a second data set from a second source such that the second source has different access to the first data set than the first source, processes the first data set, and the second data set, generates a third data set that includes the processing of the first data set and the second data set, provides, the third data set to the second source, such that the second source has access to the third data set without the need to access the first data set, and providing, to a user, an element of the third data set. The different access may be that the second source has no access to the first data set and/or the first source, thereby providing isolated data. Further, the processing is performed outside the view and/or access of the second source thereby providing isolated processing. The method, by using a container implementation within a virtual machine, instantiates one or more virtualizations of: a gateway, a router, a firewall, an isolated network, a subnet, a proxy, a network protocol element, a process module, a transform, a file system, a database, a broker, or a filter.

According to an embodiment, a method instantiates and/or destroys dynamically and/or on-demand one or more modules and/or submodules for the processing, thereby having a smaller attack window such that one or more of the modules, submodules, processes and/or data for the processing are only accessible during a small time window after instantiation and before destruction of the one or more modules, submodules, processes and/or data for the processing.

According to an aspect, a method keeps only an instantiation-recipe for the instantiation and/or destruction of the modules, submodules, processes and/or data, such that a processing and/or result of processing is selectively replicated and/or iterated even after the modules, submodules, processes and/or data are no longer instantiated or have been destroyed, the instantiation-recipe comprising a set of instructions allowing for the replication of a specific set of previously generated processes and/or results without actually storing the previously generated processes and/or results.

In an embodiment, a system includes one or more system modules, submodules, system-components, and/or system-elements that are optionally configured for automatic and dynamic instantiation, generation, configuration and/or destruction. These systems by using these system-components and/or submodules are also advantageously dynamically instantiated, generated, configured and/or disassembled, system component-by-component and/or system element-by-element. The foregoing limits the potential for undesirable malicious or erroneous human interference. For instance, the time window of exposure for data leakage is limited. Moreover, the isolation and one-way filtering described herein also limits the points of attack for undesirable intrusion and/or data leakage.

Some embodiments use and/or save one or more recipe(s) for a transaction, multiple transactions, or contract to allow replication of results instead of saving results themselves. The recipes include assemblies which are groups of assembly-plans. The assemblies and/or assembly-plans are instructions for instantiation and/or implementation of the transactions and/or contracts. Some embodiments perform iterative improvements on the recipe to obtain different results.

After a system delivery of results, and/or deletion of the instantiated system that was used for a first analysis operation run, one or more iterative analysis operations or processes may also be run. Additional iterations may be performed with or without modification of any of the datasets involved in the first analysis operation run including source-data, results-data and/or another data. The system for additional iterations in some cases is implemented by replicating the first dynamic instantiation of some or all of the first system or a previous system. Any new modification steps are optionally appended to each iteration and/or instantiation. Instead of permanently storing results, some embodiments keep a recipe and/or record of a step by step process to go from source data to results. These embodiments advantageously store and retrieve the recipe for system instantiation instead of any particular result, data, and/or output of the system. Moreover, one or more entire system(s) are advantageously generated, instantiated, dis-assembled and/or destroyed quickly and efficiently, on demand, and as needed.

The system and/or instantiation may be employed multiple times for multiple datasets and/or multiple participants that may include the same entities, different entities or a combination thereof. When the system and/or instantiation is no longer needed, the system is disassembled and/or destroyed. In particular embodiments, a set of instructions and/or parameters is saved for how to re-implement and/or re-instantiate the system such that the system is re-constructed quickly for the same, different, related and/or similar processing as before. In these embodiments, the actual data and results are not saved and only the system assembly-plan and/or instructions including any necessary parameters, are saved. Hence, particular details within the data such as PII, and/or relating to any prior participant(s), transactions, and/or contracts are isolated and not kept from one system generation and/or instantiation to the next. The system and/or method of some embodiments keep only the recipes, assemblies, and/or assembly-plans.

Some embodiments use multiple isolated network segments as smaller building blocks of a dynamically generated and/or instantiated system to address a specific task, rather than having a network that allows the system to connect. In particular instances, the subnets such as a router-subnet and/or a component-subnet are implemented as virtual isolated-type networks that are partially or fully software-based, providing scalability gains, as dozens, hundreds or thousands of network-components, system-components and/or system-elements are advantageously assembled into, for example, a system implementation and/or instantiation. In a particular implementation, a system comprises an isolated environment such as a process-module for processes and/or data-module for source-data, results-data and/or other data. The foregoing is a novel approach to network-based systems architecture.

This brief summary has been provided so that the nature of this disclosure may be understood quickly. A more complete understanding can be obtained by reference to the following detailed description and to the attached drawings.

BRIEF DESCRIPTION OF THE DRAWINGS

The following is a brief description of the drawings, in which like reference numbers may indicate similar drawing features.

" FIG. 17 includes a timing diagram showing an example life cycle of a Kiva system generated and/or instantiated in response to request from external negotiation including an example sequence of events that occur in an interaction between two participants when those events are triggered by a direct negotiation between the participants to agree upon a specific use of a dataset from the source-data participant device by the recipient and/or results-data participant device.

" FIG. 18 includes a timing diagram showing an example life cycle of Kiva system generated and/or instantiated in response to a request from a DataMart.

DETAILED DESCRIPTION

Figure 1:
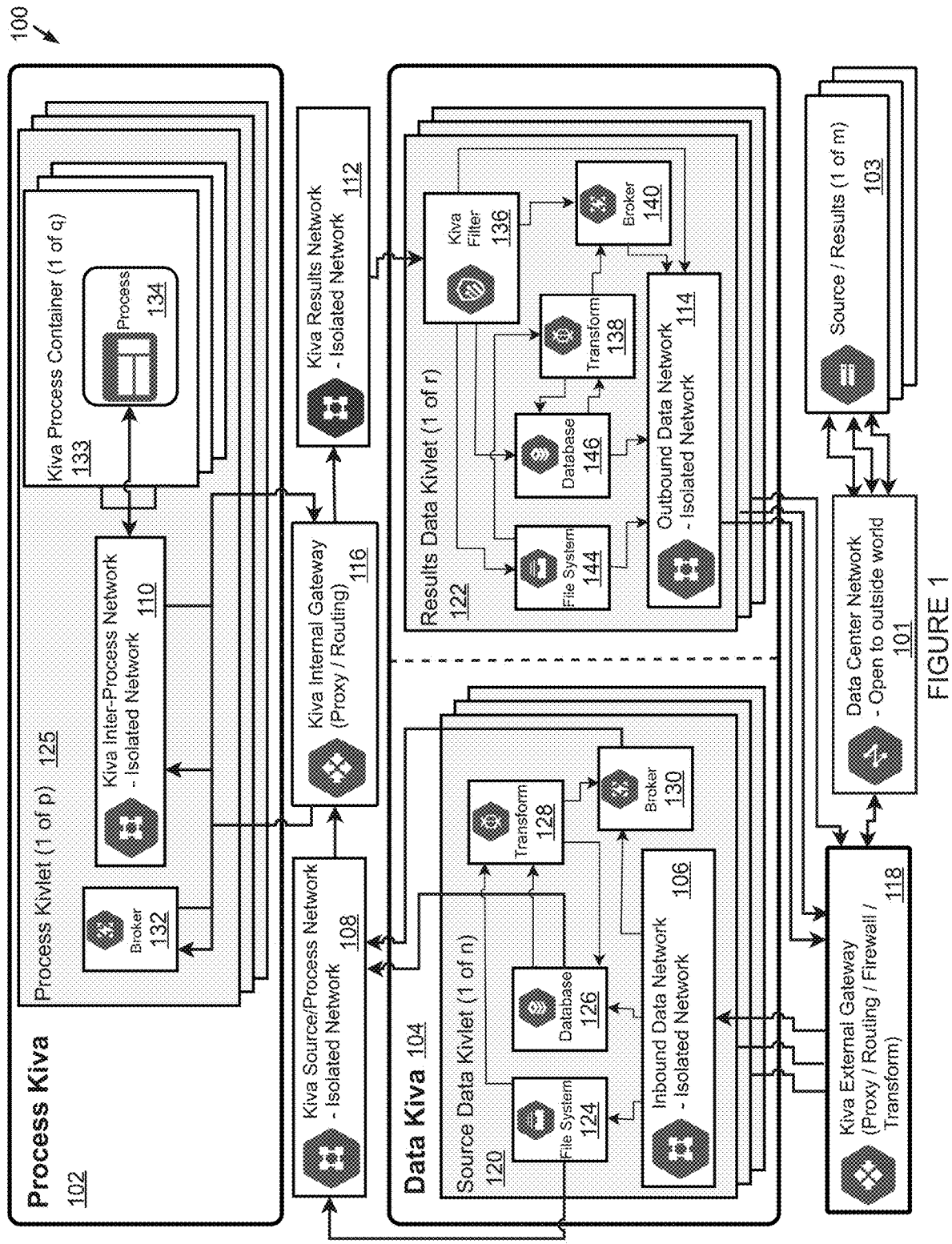
FIG. 1 illustrates an example Kiva Process-Data System that implements a multi-sided platform of some embodiments.

The present disclosure provides apparatuses, methods, non-transitory machine readable storage mediums, and systems that provide methods and systems for the execution of analysis and/or services against multiple data sources while maintaining isolation of original data source.

Some companies, Ike Facebook, Amazon, Netflix and Google, have the standalone ability to aggregate a wide breadth of data, as well as the capability to deploy digital services to harness the value of that data. As a result, these companies have been leaders in disrupting existing markets and creating new revenue streams, leading to commensurate growth in their incomes and valuations. But difficult is the path forward for companies who recognize the value of their data, but who do not control the same breadth of data or have the same inherent service deployment capabilities as the aforementioned players.

For other companies that may be smaller, newer and/or may not have the same resources, a solution is participation in data-collaboration and/or data-partnerships. It is of value for businesses to leverage inter-enterprise data with multiple different participants and/or strategic partners to generate new services and data-technology models. For example, an existing geolocation data company may form digital partnerships with other complementary sources of data to create and/or provide an array of new productive data-technology models.

The benefits of data partnerships are clear, however, there are hurdles to overcome in their implementation. Conventionally, data partnerships involve the direct transfer of one enterprise's proprietary (and highly valuable) data to its partner. This transfer is historically implemented undesirably via customized, tightly-coupled, direct integration between the IT systems of the related businesses.

The conventional approach creates several significant issues. For instance: Who holds the data? What about unintended use of that data? Who will indemnify one partner against the potential leakage or breach of their data once it has been transferred? What about privacy regulations and compliance? Other issues include: high costs and extremely long time-to-market, both from technical implementation challenges, as well as from legal negotiation issues. Conventional approaches lack necessary limitations on the use of the shared data, do not adequately solve for requirements for the handling of the privacy and security aspects of the data, and generally do not adequately cover these issues. In contrast, embodiments disclosed here in provide limitations on the use of the shared data, and further provide for the handling of the privacy and security aspects of the data, For instance, there are presently a group of software, service, and/or supply-chain vendors that address the issue of data partnerships with a historically traditional product category called Secure Data Transport. These companies include AMPLIFY (Axway), Sterling Commerce (IBM), Zix, and others. The approach that these vendors take is to use encryption and highly secured network links and infrastructure to guard against the possible interception of valuable data as it is transmitted from one enterprise's data center to its partner's data center. While securing this specific data interaction is useful, these types of solutions fail to address the larger problems of data security once the data has been received by the partner, as security at the partner's site is outside the scope of these conventional solutions known in the art. There is also no way to address potential accidental or bad faith use or revelation of the data by the partner, even if there are no security breaches to deal with at all. Additionally, issues of audit trail, and proof of compliance with regulations also fall outside the scope of what these solutions can deliver. In contrast, embodiments disclosed herein, control for and/or reduce the risk of accidental or bad faith use of data, and further provide audit trail and proof compliance.

Secure data sharing, or virtual data rooms, are another type of service that is traditionally provided by multiple vendors, including Citrix FileShare, Dropbox, and Box.com. This traditionally known service was originally conceived as a cloud-based virtual replacement for physical "clean rooms." These clean rooms were filled with a specific set of highly sensitive or confidential documents used in legal or financial applications, where access to these documents needed to be highly controlled, to both restrict which specific people could view certain documents, as well as to limit the time used to view these documents, as well as restrict the ability to copy and distribute the information in the documents.

These traditional secure data sharing services allow sensitive information to be distributed electronically via the internet, and attempt to implement a number of features intended to emulate the access control and security features of the physical clean room. These features typically use encryption, network security, and secure identification and verification in order to accomplish their goals. In all of these cases, the data in these documents is ultimately shared and transported from the source, to the secure/insecure repository, and ultimately to all of the authorized users, typically with undesirably few restrictions. Also undesirably, there is generally no attempt to isolate the original source data from the authorized partners, once their identity has been minimally and potentially inadequately confirmed.

The embodiments described herein address multiple modern challenges of "big data" (including the foregoing challenges) by: leveraging cloud-based deployment capability to generate and provide new, innovative services; and/or by generating and providing a market dominant, multi-sided platform.

Multi-sided Platform and/or Market (e.g., "DataMart")

Traditional data-technology models tend to resemble a linear pipeline. A multi-sided platform allows multiple groups of data producers and data consumers to operatively couple directly and/or indirectly to each other through the multi-sided platform, generating an advantageously scaleable nexus. For example:

FIG. 1: System 100.

FIG. 1 illustrates an example "Kiva Process-and-Data" system 100 that implements a multi-sided platform of some embodiments. As shown in this figure, the system 100 includes a data-center network 101, a "Process-Kiva" process-module 102, a "Data-Kiva" data-module 104, one or more network(s) 106, 108, 110, 112, 114, which are optionally "isolated-type" networks, an internal-gateway 116 and external-gateway 118. Within this document "Kiva" is used interchangeably with "module" and "Kivlet" is used interchangeably with "submodule."

The system 100 further includes one or more data-participants 103 (up to "m" data participants). The data-participants 103 may include data partners, data support entities, researchers, scientists, and/or other entities, including data sources, data recipients, e.g., consumers and/or customers of raw, untransformed data and/or of transformed, results-type data.

One or more of the networks 106, 108, 110, 112, 114 are specifically generated and/or instantiated as isolated-type networks, and advantageously implement and include a plurality of functional network types including inbound-data network 106, source-process network 108, inter-process network 110, results-network 112, and outbound-data network 114. Isolated-type networks are further described herein.

The system 100, in an implementation, is coupled to the data-center network 101 from which the system 100 is accessible to the participant(s) 103 who have contracted for the use and services of the system 100. Some embodiments of the system 100 implement a specific set of rules. For instance, a particular embodiment implements the following rules: (a) the parameters for the external-gateway 118 are predetermined and/or prescribed, e.g., by a market-place contract; (b) the external-gateway 118 manages all inbound and outbound communication to and/or from the system 100; and (c) in an embodiment, substantially all of the networks implemented for the system 100 are isolated-type networks.

In an implementation, valuable data is provided into the data-module 104 via the external-gateway 118. The data is provided by one or more data-participant(s) 103 such as a data-source participant or partner that is coupled to the data-center network 101. The data-center network 101 is preferably external to the data-module 104. In some embodiments, the data-module 104 is only accessible via the external-gateway 118 and/or the inbound-data network 106. The external-gateway 118 may provide services such as proxy, routing, firewall, and/or a variety of transform services such as internet protocol (IP), other protocol, data and/or other services.

From the external-gateway 118, the data may be allowed to pass into one or more source-data submodule(s) 120 or "Kivlet(s)" of the data-module 104 via the inbound-data network 106. In the example of FIG. 1, the data-module 104 includes one or more source-data submodules 120 (up to "n"), and each of the source-data submodules 120 include at least one inbound-data network 106. Preferably, at least one or more of the inbound-data networks 106 include an isolated-type network. A particular implementation of the data-module 104 is further described in relation to FIG. 2.

The data-module 104 outputs to a source-process network 108, which provides output to the internal-gateway 116. In some implementations the source-process network 108 is an isolated-type network. The internal-gateway 116 outputs to the process-module 102. Processing of the data may occur within the process-module 102 before data and/or results are output back to the internal-gateway 116, which further outputs to the results-network 112. Hence, in the course of the foregoing, the internal-gateway 116 provides proxy, routing and/or other services within the system 100, and more specifically between the source-process network 108, the process-module 102 and/or the results-network 112.

The results-network 112 outputs to a results-data (Kivlet) submodule 122 of the data-module 104. The example system 100 of FIG. 1 illustrates a plurality of both results-data submodules 122 (up to "r" submodules) and source-data submodules 120 (up to "n" submodules) implemented and/or isolated by using a single common data-module 104. Alternatively, multiple data-modules 104 are implemented and/or instantiated, for instance, to provide separate data-modules 104 for inbound-data that are further isolated and/or separated from outbound data (see e.g., FIGS. 15-16). One of ordinary skill further recognizes additional permutations for the modules 102 and 104, and the submodules 120, 122, and 125. Regardless of the specific implementation, the results-data submodule 122 outputs via the outbound-data network 114 to the external-gateway 118.

The external-gateway 118 outputs to the data-center network 101, where the data and/or results are available to one or more data-participants 103 such as, for example, data-results recipients, consumers, and/or customers.

The foregoing and additional features of the system 100 are further described in relation to drawing figures referenced below. For instance, the examples of transform 128, broker 130, broker 132, process container 133, transform 138, and broker 140, of FIG. 1, are further described in relation to the embodiment of FIG. 2 by using transform 228, broker 230, broker 232, process container 233, transform 238, and broker 240, and also by using similar reference numerals in relation to FIG. 3, FIG. 4, FIG. 5 and FIG. 6.

Figure 2:
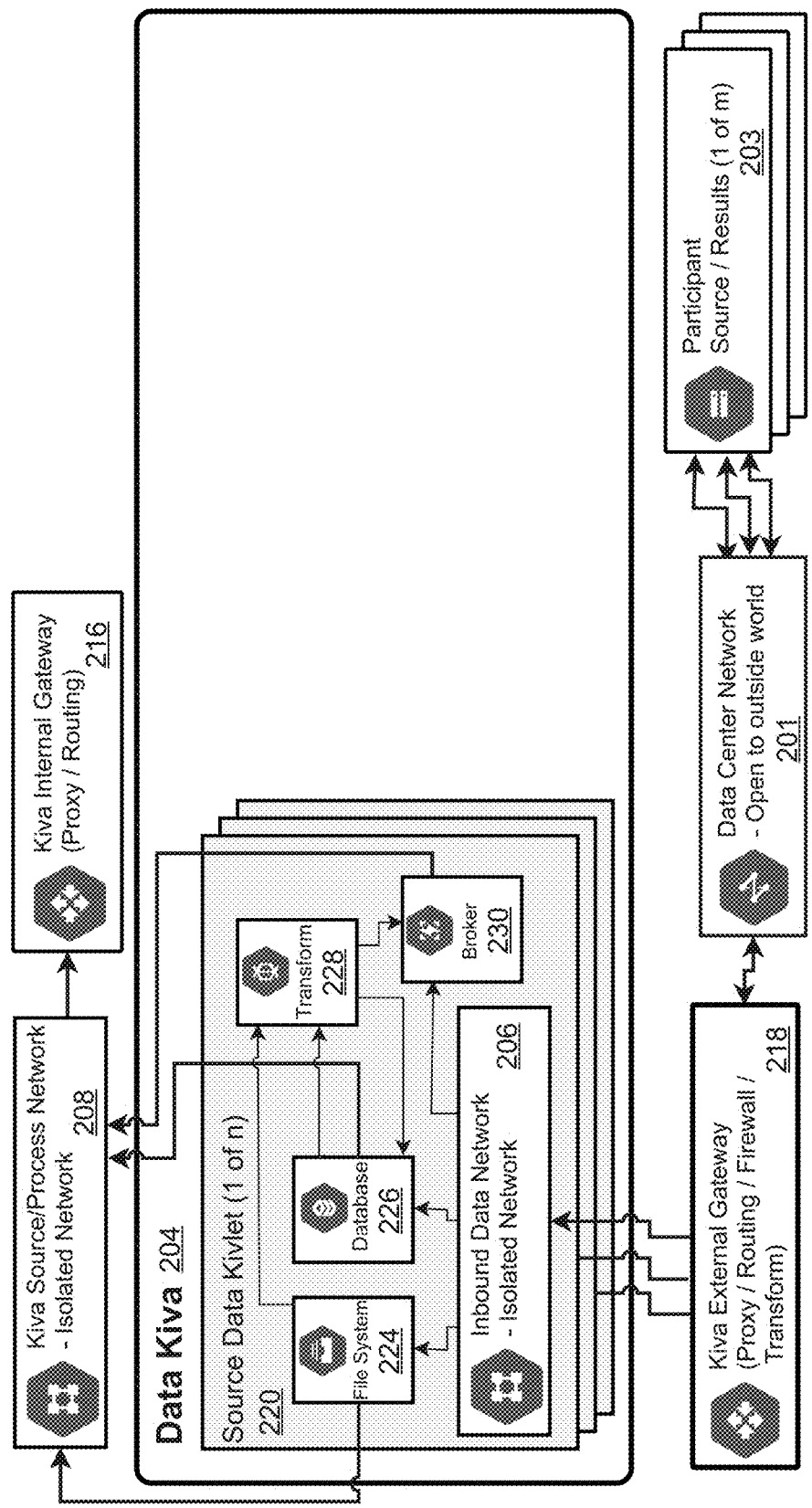
FIG. 2 illustrates data provided to a data-submodule of a data-module via an external-gateway.

FIG. 2: Data-Module 204 (Kiva) and Isolation.

FIG. 2 illustrates data provided to a data-submodule 220 of a data-module 204 via an external-gateway 218. As shown in this figure, the data may be sourced from an external data-participant 203 by using a data-center network 201. FIG. 2 further illustrates that each data-module 204 may contain one or more data-submodules 220 and for each data-module 204 there can be "n" number of data-submodule(s) 220. Each data-submodule 220 may comprise one or more of a file-system 222, a database 224, a transform 228, and/or a data-broker 230. Each data-submodule 220 may communicate within itself or with other data-submodule(s) 220 by using an inbound-data network 206.

The data-submodules 220 of some embodiments each have their own dedicated inbound-data network 206 that may be internal to the respective data-submodule 220. Alternatively, the data-submodules 220 share one or more inbound-data networks 206. For some configurations, each inbound-data network 206 is an isolated-type network.

In a particular embodiment, each data-module 204 and/or each data-submodule 220 only communicates with locations external to the data-module 204 by using the external-gateway 218 and/or the inbound-data network 206. Hence, the inbound-data network 206 and/or the external-gateway 218 controls and is for communicating with external locations such as the data-center network 201.

Within FIG. 2, the file-system 224 is a storage subsystem that is targeted for use with unstructured data. Examples of unstructured data include Microsoft Word documents, other text documents, PDF files, emails, photos, audio files, and the like. The database 226 is a storage subsystem that is targeted for use with structured data. Examples of structured data include data held in a table in an SQL database, or certain spreadsheet data. Accordingly, the system 200 of FIG. 2 is advantageously configured to receive, handle and/or process a variety of data types.

The transform 228 is a functional block that performs various data cleaning, extraction, validation, and transformation operations on the source data to allow easier and more accurate consumption by processes, e.g., the processes 334 described below in relation to the process-module 302 of FIG. 3. For instance, the transform 228 may involve converting streaming data to batch loaded data and vice versa.

The data-broker 230 is a functional block that is configured to receive incoming streaming data in various formats, and then reformat the incoming and/or streaming data in a manner suitable for consumption by processes in a subsequent step.

The inbound-data network 206 includes an example of an "isolated network," which in particular implementations only networks together objects within a specified and/or pre-determined domain. In an embodiment, an isolated network is implemented by using a dynamic network segment, which is a network segment that is generated, instantiated, and/or destroyed on-demand by a specific computing environment. For instance, in FIG. 2, the inbound-data isolated network 206 only networks together and/or provides access to objects within the data-submodule 220 associated and/or prescribed for that inbound-data isolated network 206.

Moreover, only appropriate data are routed from the external-gateway 218 by using the inbound-data isolated network 206 to each of the file system 224, database 226, broker 230 and/or transform 228, respectively. Further, as described above, the inbound-data isolated network 206, and therefore each data-submodule 220 of the "n" data-submodules 220, only communicates outside of the inbound-data network 206 through internal-gateway 216 and/or external-gateway 218.

Figure 3:
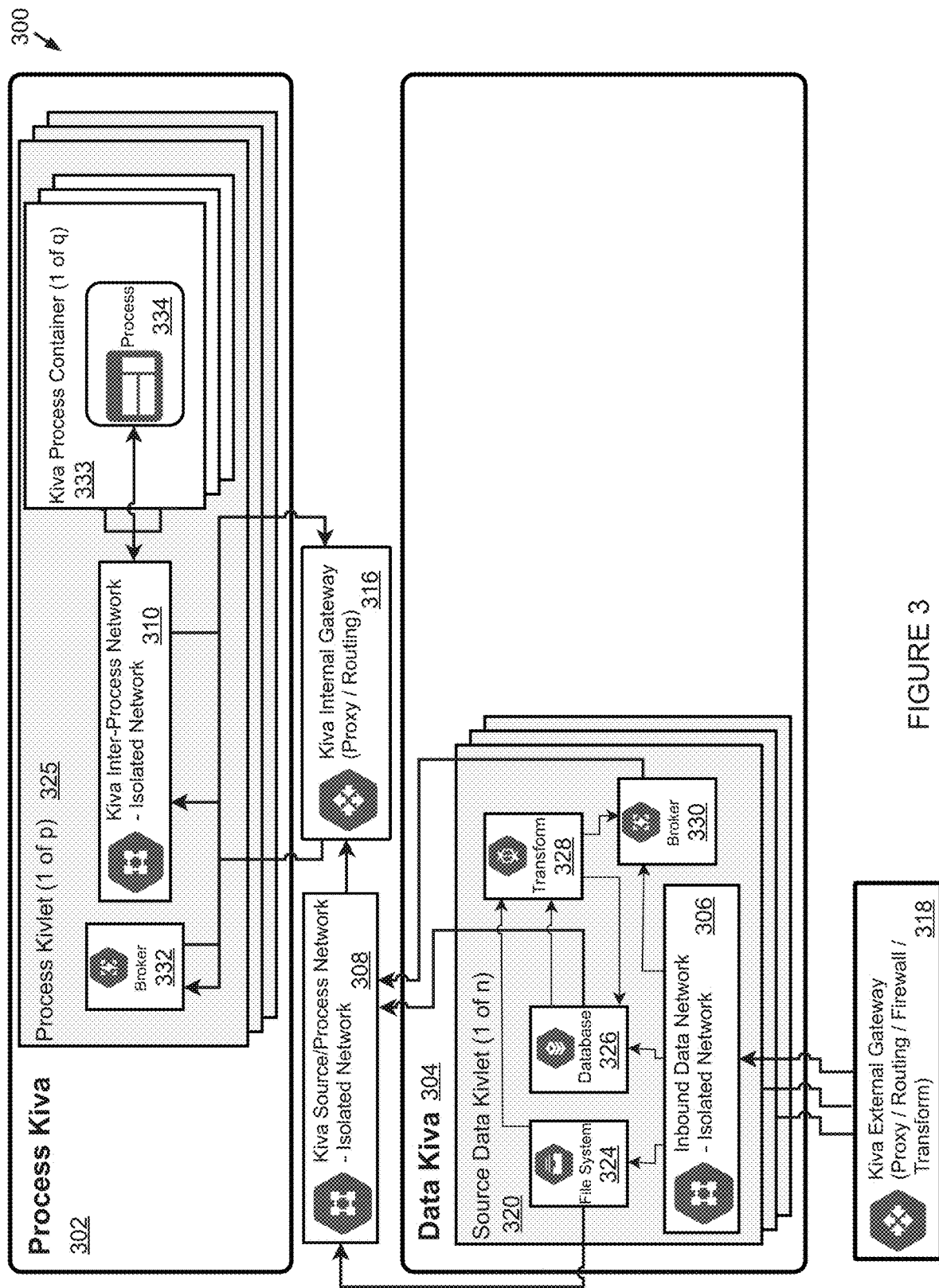
FIG. 3 illustrates example processes within a process-container of a process-module, for performing operations upon data of a data-module such as, for example, the data described in relation to FIGS. 1 and 2.

FIG. 3: Process-Module 302 and Data Processing

FIG. 3 illustrates example processes 334 within a process-container 333 (up to "q") of a process-submodule 325 (up to "p") of a process-module 302, for performing operations upon data of a data-module 304 such as, for example, the data described in relation to FIGS. 1 and 2, or subsequent figures. An internal-gateway 316 separates the "n" data-submodule(s) 320 from the "p" process-submodules 325 and from the "q" process-containers 333 of the process-module 302. In an embodiment, the processes 334 are only permitted access to the data of the data-module 304 through the internal-gateway 316 and via a source-process network 308, which is optionally also an isolated-type network. This prevents the processes 334 from accessing data which the processes 334 do not have explicit permission upon which to operate.

Within the process-module 302 there are up to "p" number of process-submodule(s) 325. For process-only communications and/or inter-process communications, each process-submodule 325 is configured to communicate with itself or with other process-submodules 325 within the process-module 302 by only using an inter-process network 310, and without using internal-gateway 316 or external-gateway 318. To communicate with data such as, for example, process 334 communications with the data of the data-submodules 320, each process-submodule 325 preferably only communicates through the source-process network 308 and/or via the internal-gateway 316.

Figure 4:
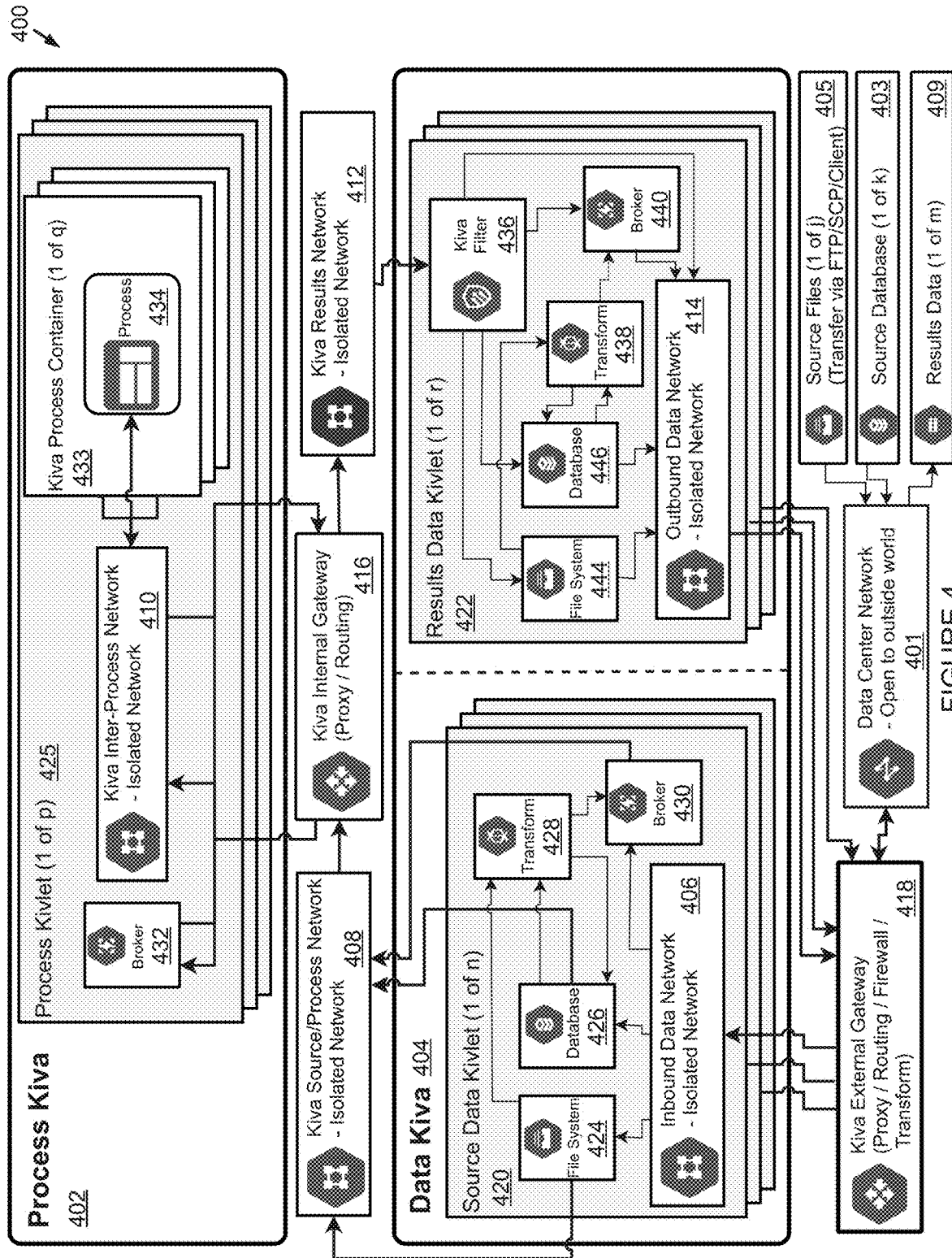
FIG. 4 illustrates batch source-data being provided through the external-gateway to the data-module from an external source which in this case comprises participant source-database and/or participant source-files.

FIG. 4: Batch Source-Data

FIG. 4 illustrates batch source-data being provided through the external-gateway 418 to the data-module 404 from an external source which in this case comprises a participant source-database 403 and/or participant source-files 405. This data may reside in multiple formats at the external source site, including within a database (e.g., SQL or other), or as standalone files, which may be transferred via standard file transfer methods such as file transfer protocol (FTP), secure-FTP, or Secure Copy Protocol (SCP), or by using client software that is generic or custom to the system 400. In an implementation, the batch source-data is received and stored in the file-system subsystem 424 or database subsystem 426 within a data-submodule 420 of the data-module 404.

FIG. 4 further illustrates that once source-data has been processed by the process-module 402 and/or has traversed the system 400, then the results-data may be provided back to a data-consumer and/or result-participant 409. In an embodiment, the result-participant 409 is a different participant than the source-data participant(s) 403 and/or 405. Alternatively, the result-participant 409 is the same as one or more of the source-participant(s) 403 and/or 405. For instance, the source-data of the data-module 404 is processed by the process-module 402, and results and/or data are provided to, and/or stored within one or more results-submodules 422 of the data-module 404. One or more participants and/or participant devices 409 may selectively receive access to the results-data within the results-submodule(s) 422 by the external-gateway 418, via the data-center network 401.

In these embodiments, an inter-process network 410 and/or a broker 432 for each of one or more process-submodules 425 of the process-module 402, provides output to an internal-gateway 416 which outputs to a results-network 412. The results-network 412 outputs to a filter 436 of each respective results-submodule 422. The filter 436 is for implementing policies on results-data such as redaction, removal of personal-identifiable information (PII), differential privacy algorithms, and/or ensuring a minimum amount of subset data to mitigate the mosaic effect.

Within a particular results-submodule 422, the filter 436 outputs to a broker 440, a file system 444, a database 446, and/or a transform 438. One or more of these system-elements 436, 438, 444, and/or 446 output(s) to the broker 440. The broker 440 outputs to an outbound-data network 414. The file-system 444, database 446 and/or the transform 438 are operatively coupled to each other and to the broker 440 and/or the outbound-data network 414. Here, the broker 440 validates the data-consumer endpoint's access and allows consumption of the dataset in the expected, configured, instantiated and/or desired manner and format for that endpoint.

The outbound-data network 414 outputs to the external-gateway 418. Accordingly, access to each results-submodule 422 is controlled by the outbound-data network 414 and/or the external-gateway 418. In this way, only the appropriate participant device(s) 403, 405 and/or 409 may receive the results-data from the results-submodule(s) 422 of the data-module 404.

Figure 5:
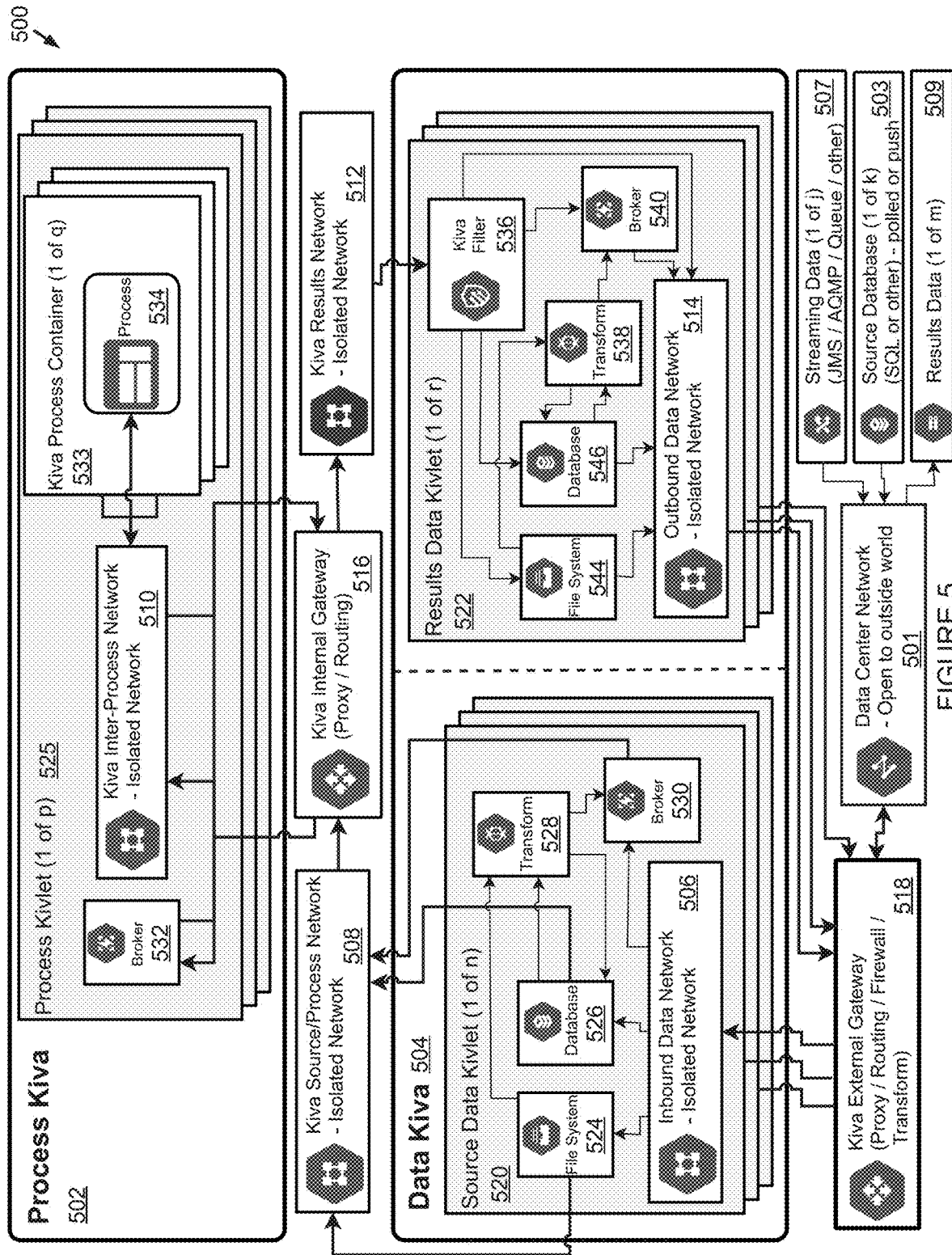
FIG. 5 illustrates real-time streaming source-data being provided through an external-gateway to a data-submodule of a data-module from an external source, which in this case includes source-database and/or streaming-data.

FIG. 5: Real-time and/or Streaming Source-Data

FIG. 5 illustrates real-time streaming source-data being provided through an external-gateway 518 to a data-submodule 520 of a data-module 504 from an external source, which in this case includes source-database 503 and/or streaming-data 507. This data may be streamed by using an existing messaging protocol such as JMS, AQMP, Queue, Topic, and the like. If the data resides in a database 503 (e.g., SQL or other), the data may be converted into a datastream. Datastream conversion may be performed by a repeated time interval polling operation that queries the database 503 and pulls data out on a regular clock cycle. Datastream conversion may also be performed by having the database 503 push out data to the data-module 504 on a regular time interval.

FIG. 5 further illustrates that once source-data have been processed by the process-module 502 and/or has traversed the system 500, then the results-data may be provided back to a source-data participant 503, 507 and/or result-participant 509. In an embodiment, the result-participant 509 is a different participant than the source-data participant(s) 503 and/or 507. Alternatively, the result-participant 509 is the same as one or more of the source-participant(s) 503 and/or 507. For instance, the source-data of the data-module 504 is processed by the process-module 502, and results and/or data are provided to and/or stored within one or more results-submodules 522 of the data-module 504. Then, similar to the description of FIG. 4, within the system 500 of FIG. 5, only appropriate participants and/or participant devices 509 may selectively receive access to the results-data within the results-module 522 by the external-gateway 518 and/or the outbound-data network 514, via the data-center network 501. In any of the examples herein, any of the participants may include physical, software and/or hardware devices, or a combination thereof. Examples of transform 538 and broker 540 are described herein in relation to FIG. 1 through FIG. 6, for instance, by using the transform 438 and broker 440 of FIG. 4.

Figure 6:
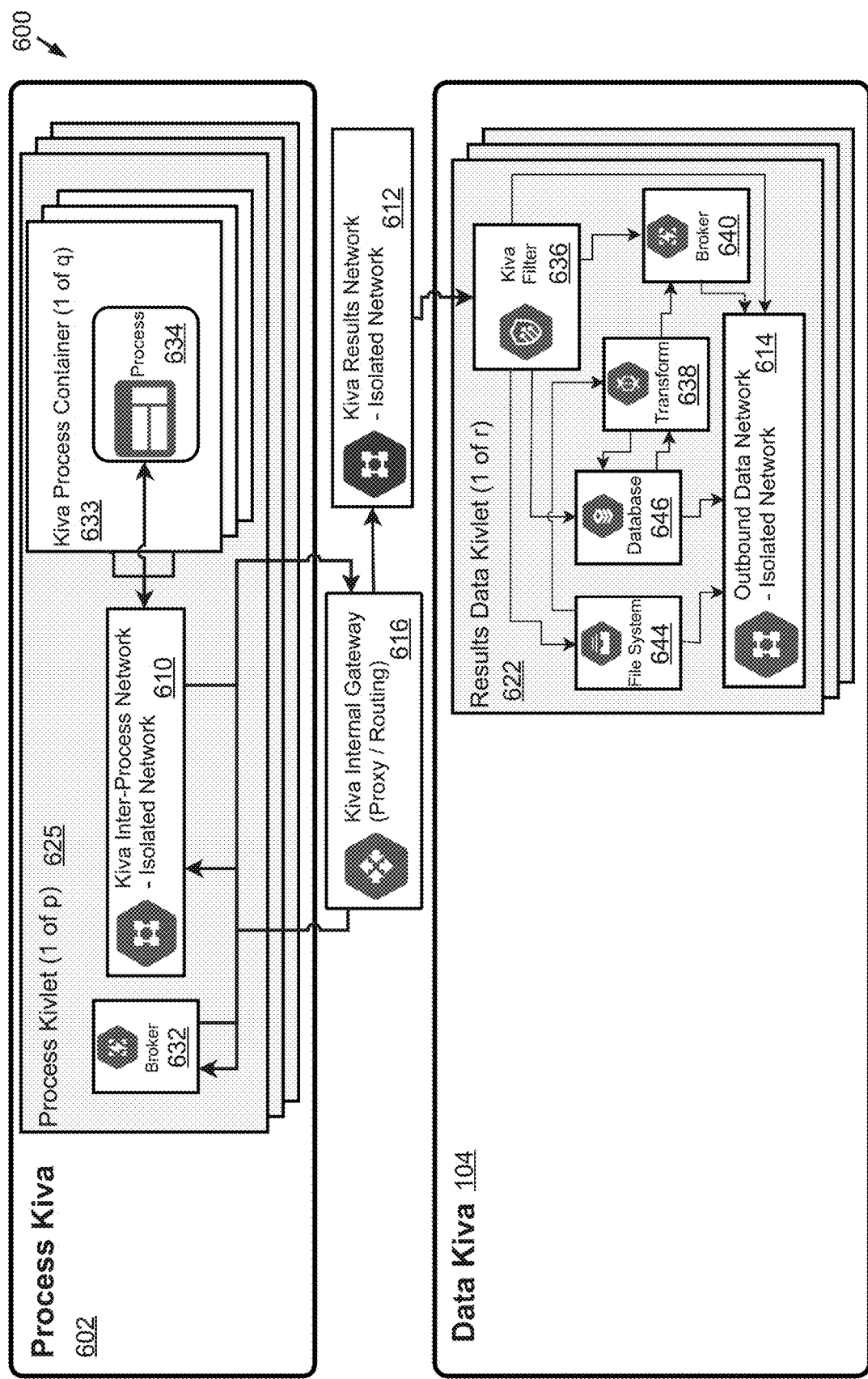
FIG. 6 illustrates the completion of one or more process(es) or operations upon various source-data, and the publishing of the results to a results-submodule.

FIG. 6: Analytics and Data Anonymization.

FIG. 6 illustrates the completion of one or more process(es) 633 or operations upon various source-data, and the publishing of the results to a results-submodule 622. As shown in this figure, a system 600 includes a process-module 602 comprising one or more process-submodules 625. Each process-submodule 625 has one or more inter-process networks 610, brokers 632, and process-containers 633 (sometimes numbered 1 through "q"). Each process-container 633 includes one or more processes 634. The processes 634 are domain specific atomic processes and/or algorithms that are needed to solve a specific problem and produce the desired set of results data.

Example processes 634 include a first example process that aggregates multiple data records that describe the characteristics or behaviors of specific subjects, into a merged database and organizes them according to broad groups based on similarities across multiple data fields, allowing the identification of common behaviors or characteristics of these groups. One application of this first example process is to generate a database of food preferences in a region according to demographic groups such as age and income level, while removing all personally identifiable information and not sharing any original source data.

Example processes 634 further include a second example process that finds a correlation between a small set of data records that partially describe a specific individual, and a larger database that contains more comprehensive information about the characteristics and behaviors of aggregated groups of people, thus allowing the extrapolated prediction of characteristics and behaviors of the individual based on the correlated group. One application of this second example process is for a doctor to take one patient's descriptive data and symptoms and compare it to the "population health" database of a region to discover if there are any specific local health trends that could help diagnose a specific patient, such as an outbreak of measles among a specific school neighborhood, while maintaining that patient's anonymity and not sharing any of the original source data.

Example processes 634 also include a third example process that takes a specific desired data outcome, aggregates data records from multiple disparate databases containing uncorrelated data records, and applies an optimization algorithm to determine which data records when combined in the algorithm most closely match the desired data outcome. One application of this third example process is for a logistics services company, who has a customer who requires a specific part at a factory within a specific time window, to use an optimization algorithm that is applied to one database that contains the current location of trucks, and the manifest of the cargo that is loaded on those trucks, a separate database that contains the current customer and destination for each item of cargo on each truck, and several separate databases that contain many customers factory and inventory information, to provide the geographical location of the truck carrying the specific part that will best fulfill the requesting customer's need. A business decision and/or negotiation may then be done on an anonymized basis, without sharing the original source data, between the requesting customer, and the original customer of that specific part to re-route that specific part to the new destination.

The process-submodules 625 of the process-module 602 provide output to one or more results-submodules 622 of a data-module 604. Each results-submodule 622 may include one or more of filters 636, transforms 638, file-systems 644, databases 646, brokers 640, and/or outbound-data networks 614. The outbound-data network 614 in some implementations includes an isolated-type network.

Access from the processes 634 to each results-submodule 622 is preferably only through an internal-gateway 616 and/or a results-network 612, thus preventing any unexpected or inappropriate data from being sent to an undesirable internal and/or external recipient. In addition to the internal-gateway 616, the filter 636 subsystem acts as an additional filter that ensures that even expected results data that is passed through the internal-gateway 616 is additionally filtered in order to ensure that no personally identifiable privacy data (or PII) is allowed to be sent to an inappropriate recipient and/or to an unauthorized location or device inside and/or outside the system 600. The filtering of some embodiments includes filtering for specific types of data such as names, address or identification numbers, as well as checking for adequate sample size anonymization by making sure that various results sets are large enough to avoid privacy breaches through a mosaic effect analysis or other similar analyses.

As described above, data or results-data that is stored to one or more results-submodules 622 of the data-module 604, is generated, instantiated and/or configured to be made available to appropriate or authorized participants and devices.

Figure 7:
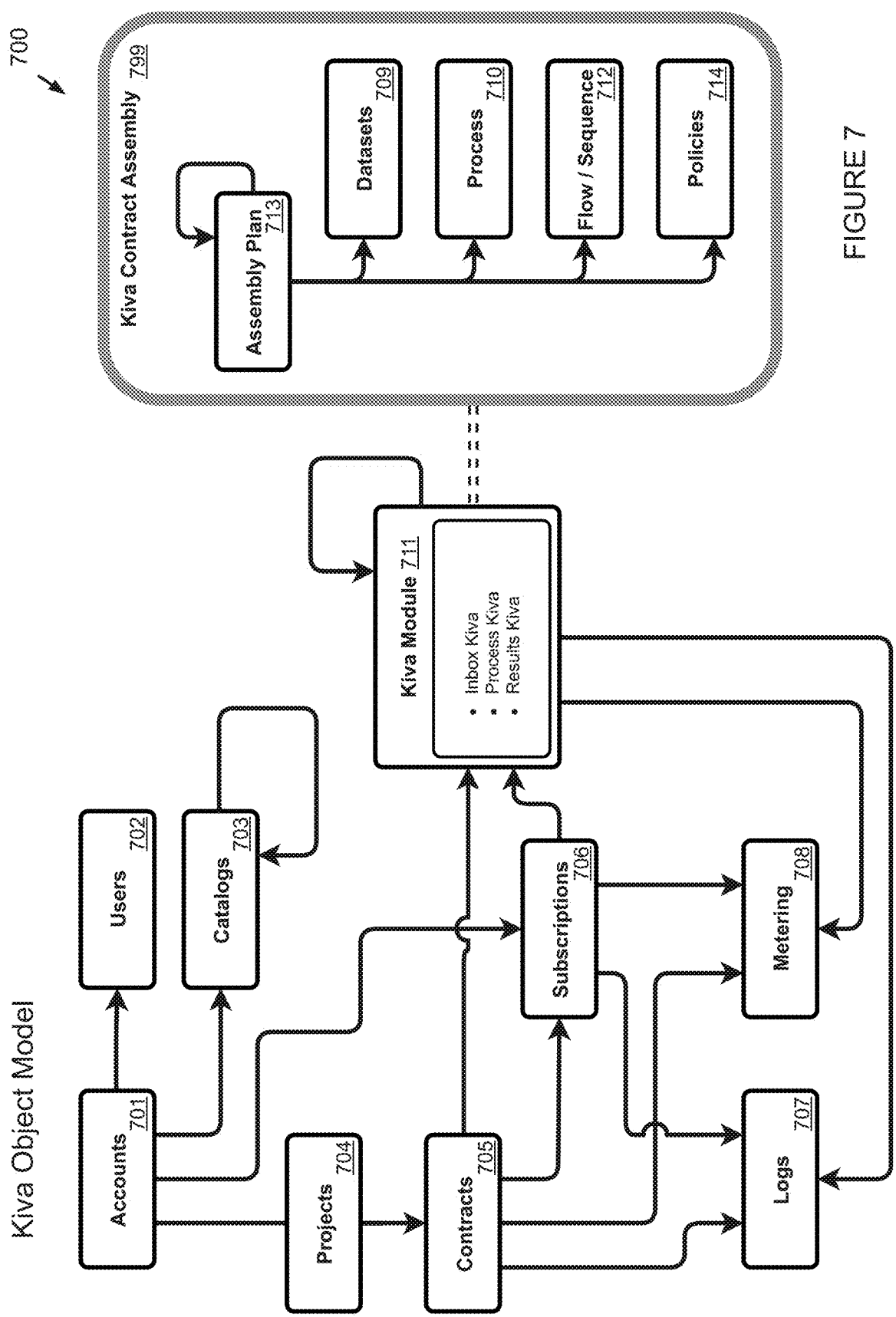
FIG. 7 is an object model showing different objects used in a particular Kiva-module ecosystem implementation.

FIG. 7: Object Model

FIG. 7 is an object model (700) showing different objects used in a particular Kiva ecosystem implementation 700. As shown in FIG. 7 logical objects that are used to manage the ecosystem 700 include "Accounts" 701 for "Users" 702 and "Catalogs" 703. A Catalog 703 is an organizational structure that allows users to make entries that classify and group the users' various content (e.g., Datasets 709, Processes 710, Assembly Plans 713), allowing easier access to, and discovery of related content for existing users of the content, as well as for potential partners and customers. A particular method for the organization of the Catalog 703 is the use of industry models, which are described further in relation to FIG. 8.

Within FIG. 7, the Accounts 701 are used to generate Projects 704 and/or Contracts 705. The Contracts 705 specify parameters for Subscriptions 706, and specify Assembly Plans 713 that are included in the Kiva Contract Assembly 799. The Contract Assembly 799 then contains the information necessary to specify parameters for the Kiva modules 711, described in relation to FIGS. 1 through 6 and other figures herein, such as the data-module 104 and/or the process-module 102 of FIG. 1 (and related submodules thereof). The Contract Assembly 799 is then used on-demand and/or at appropriate times to instantiate or generate on-the-fly Kiva modules 711 that are applied for a specific purpose and/or one or more specific process(es) such as described in relation to FIG. 6, for example.

As shown in this figure, the Assembly-Plan 713 includes one or more Datasets 709, Process(es) 710, Flows/Sequences 712, and/or Policies 714 that are used by the Kiva Contract Assembly 799 to generate and/or instantiate, on-demand, Kiva modules 711 described by reference to the other figures herein. The model 700 also has Logs 707 to record system activities and/or Metering 708 to record the details of each completed data transaction, thus allowing the ability to calculate the total amount of payment and ensuring the transaction complies with the constraints specified in a Contract 705, whose terms specify one or more system-parameters.

As further described below, the parameters are advantageously used by the system-configurator (see e.g., system-configurator 1427 of FIG. 14 and 1527 of FIG. 15) to generate and/or instantiate a system-manifest and sequence of all Assembly-Plans 713, Datasets 709, Processes 710, Flow/Sequences 712 and Policies 714 associated with Kiva Contract Assembly 799, by using the method 1400. More specifically, the foregoing operation of a particular system-configurator is defined at configurator steps 1427 of runtime 1415 in FIG. 14. In an embodiment, the Assembly-Plans 713 are generated by user preferences such as by using the graphical user interface described in relation to FIGS. 21-22. The system-manifest is an inventory list of everything needed to generate and/or instantiate a system of embodiments. Hence, the system-manifest uses the Assembly-Plans 713 to identify and/or determine the system-components and/or system-elements for a system of some embodiments. In specific embodiments, the system is then advantageously generated and/or instantiated based upon the foregoing for use by one or more participants and/or users.

For instance, the system-configurator first determines the number of process and/or data (e.g., isolated) Kiva modules 711 and/or submodules necessary to fulfill the constraints provided by Contract 705. These specified modules and/or submodules are then instantiated, configured and/or coupled into a system such as the embodiment shown in FIG. 1 as system 100, with specific type and composition of Kiva modules 711 (of FIG. 7) and/or submodules determined according to the specific components of Assembly-Plans 713. For example, source Datasets 709 utilizes source Data Kivlet submodule 120, Process 710 utilizes Process Kivlet submodule 125 and results Dataset 709 and Policies 714 utilizes results Kivlet submodule 122 with policies enforced by Kiva Filter 136.

The objects of FIG. 7 both modify and configure the behaviors of the various Kiva modules, submodules, system-components and/or system-elements described in relation to FIGS. 1 through 6, and specify the types of transformation and processing operations that are performed on a source dataset. In an implementation, the objects are defined and/or generated before the modules, submodules, system-components and/or system-elements that perform those operations are instantiated. The objects of FIG. 7 further specify the types of filtering, redaction, and presentation that are performed on a results dataset after there are data interactions within a set of modules and/or submodules. FIG. 7 also illustrates the object hierarchy of an embodiment as objects contain references to other objects. In one example for instance, an Account object 701 has multiple Users 702, as well as multiple Projects 704, and each Project 704 has multiple Contracts 705 associated therewith. One of ordinary skill recognizes multiple permutations of hierarchies for the example objects of FIG. 7.

Figure 8:
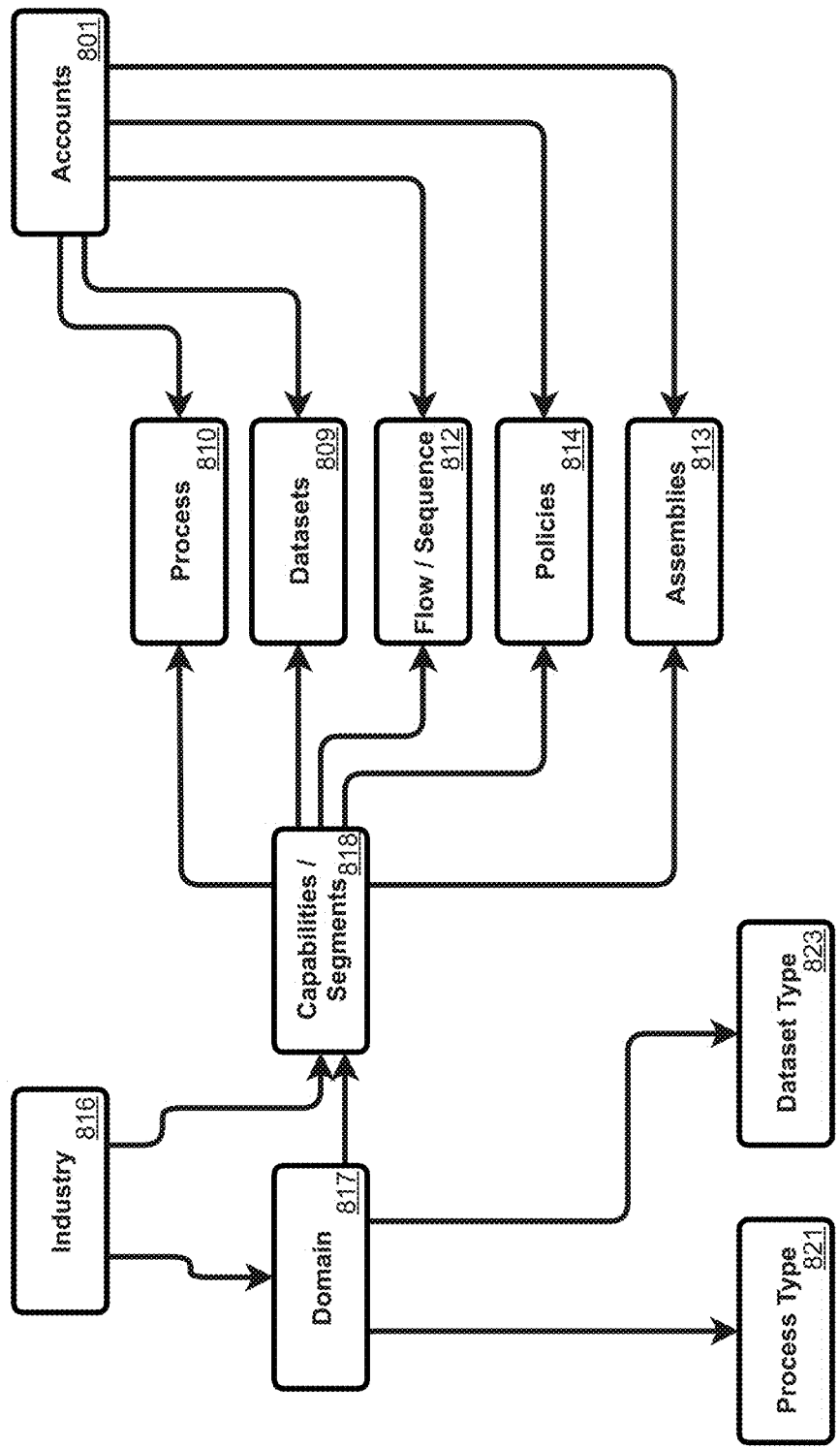
FIG. 8 shows an industry model that is optimized for organizing components and relationships around a specific vertical market.

FIG. 8 shows an industry-model 800, e.g., for implementing Catalog 703 of FIG. 7. As shown in FIG. 8, the catalog industry-model 800 is optimized for organizing components and relationships around a specific vertical market such as, for example, a "new drug market demand analysis", or "vehicle sensor data." In these optimizations, participants of a specific vertical market take advantage of a common organizational structure to more efficiently search, publish or use specific components and assemblies of the systems described in relation to FIGS. 1 through 7. In the example model 800, the content of a particular Industry 816 is organized into a Domain 817 for the Industry 816 that is divided into Process(es) 810 and Dataset(s) 809. The particular Industry 816 of FIG. 8 is also organized by Capabilities and/or Segments 818 for that Industry 816. These industry models such as the illustrated industry-model 800 are then used to organize content originating from multiple users and/or providers that are related to the same vertical market, thereby allowing interested parties to easily find and use a relevant set of system-elements including, for example, the Datasets 809, Processes 810, and Assemblies 819 that are of particular interest to them. In an embodiment, one or more system-elements, Processes 810, Datasets 809, Flows or Sequences 812, Policies 810 and/or Assemblies 819 are predetermined and/or pre-populated within a pre-defined set of palettes for a user-interface for one or more Accounts 801 of a data-participant related to the particular Industry 816. These system-elements may appear as movable and connectable hexagons within the palettes. The user interface of various embodiments is further described in relation to FIGS. 21-22. The optimizations of FIG. 8 may improve efficiency and use, but they are not required for the participants to use the system such as the system embodiments described herein.

The illustrated industry-model 800 may assist a data-participant to locate system-components and/or system-elements to define one or more projects 704 and/or contracts 705 of FIG. 7, which are used to generate specific instances of a set of Kiva modules and/or submodules to execute a specific shared dataset operation. The Contract of FIG. 7, for example, pre-defines the authorized participants and/or devices involved in a shared operation, the source datasets, the transformations and filtering needed, the processes that are executed against that data, the results datasets, and the filtering, redaction, and presentation or application usage that are run on those results. Once the foregoing configuration is determined, the modules and/or submodules of a system (e.g., system 100 through 600) is automatically instantiated and/or generated, without any human intervention or action, which helps to insure that there will be no unanticipated system events such as, for example, data leakage or unspecified actions taken, or against any unauthorized data.

Figure 9:
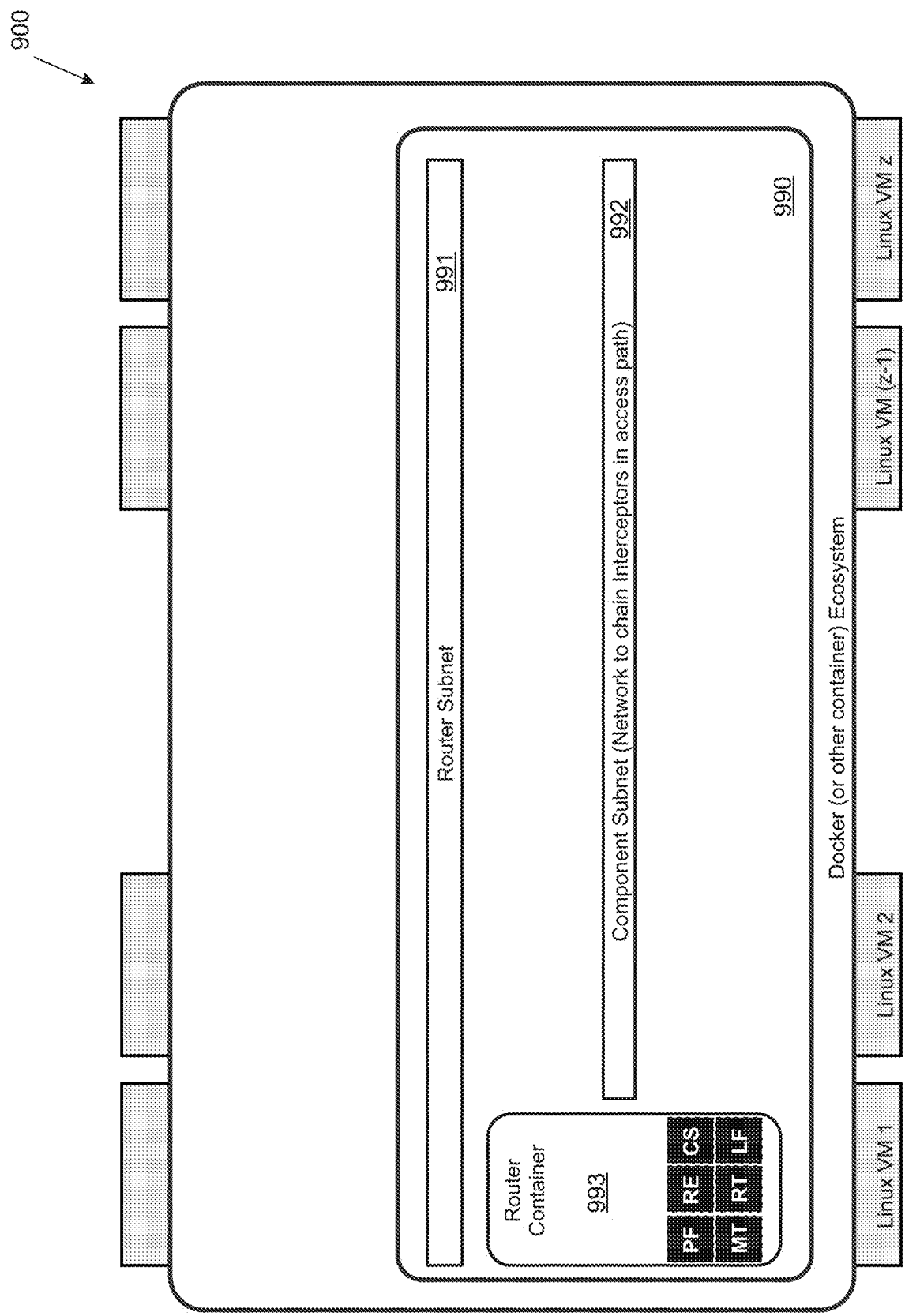
FIG. 9 shows implementation details of a base or atomic building block that is used for various system-components shown in the drawing figures described herein.

FIG. 9: Kiva Atomic Building Block for System Component(s)

FIG. 9 shows implementation details of a base or atomic building-block 990 that is used for various system-components shown in the drawing figures described herein. For instance, in some embodiments, the system-components for which the building-block 990 is used includes one or more of a data-submodule 120, a results-submodule 122, a process-submodule 125, a network 106, 108, 110, 112 and 114, and/or a gateway 116 and 118, of FIG. 1. This modular design and construction provides advantages in development, testing, operations and maintenance. Some embodiments include virtual machine (VM) implementations such as Linux VM's, and/or in conjunction with container-type implementations such as Docker, to provide useful isolation and/or networking features. The example illustrated by FIG. 9 shows the building-block 990 implemented within a Docker ecosystem of one or more virtual machines. One of ordinary skill recognizes additional advantageous implementations.

As shown in FIG. 9, the building-block 990 includes a router-subnet 991, a component-subnet 992, and a router-container 993. The router-container 993 includes a programming and/or messaging framework (MT), a basic router (RT), a logging framework (LF), a plugin framework (PF), a rules engine (RE), and a configuration-storage (CS).

The programming and/or messaging framework (MT) enables coordination and/or communication between the various programming functions and/or means that reside within the router container 993. Implementations of the programming and/or messaging framework (MT) enable asynchronous and/or synchronous communication. The basic router (RT) performs standard routing of internet protocol (IP) packet traffic. The logging framework (LF) allows the recording of an audit trail of activity within the router container 993. The plugin framework (PF) provides a common interface that allows the easy addition and integration of new functional blocks within the router container 993. The rules engine (RE) provides a standardized way to express and execute logical sequences of commands that make up a routing rule, or other access policy. The configuration storage (CS) holds the information about which pieces are used within the router container 993, or other coupled components, how they are coupled, and how they should be initialized.

Figure 11:
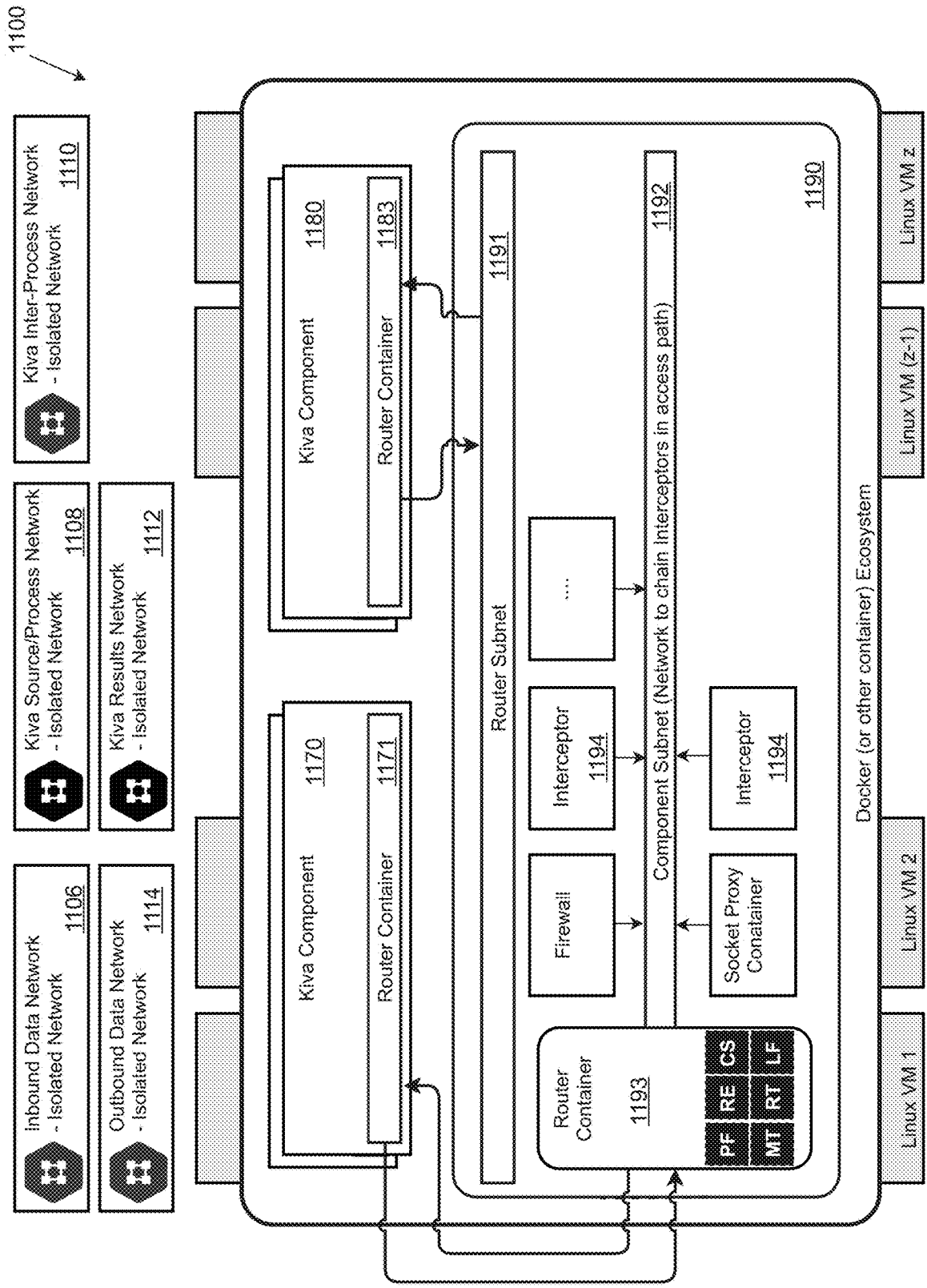
FIG. 11 shows the implementation of the various Kiva network-blocks in previous diagrams by using the Kiva Atomic Building Block of FIG. 9 for a system.

The Router Subnet 991 of an embodiment is internal to the illustrated building-block 990, e.g. of an implemented system-component 990 such as a gateway, isolated-network, module and/or submodule, for example. The router subnet 991 is configured to provide communications internal within the block of system-component 990 and external to the block of system-component 990. For instance (as shown in FIG. 11), the router-subnet 991 of the block implemented system-component 990 is externally facing and is used to couple to other system-components 990. In this manner, multiple system-components 990 are configured to couple and/or communicate by using the router-subnet 991 of each system-component 990. The router-subnet 991 also allows for communications with system-elements that are internal and/or external to the block implemented system-component 990. System-elements include a process, a transform, a file-system, a database (DB), and/or a broker. An example of both external and internal system-elements communicating with an implemented system-component 1290 is further described in relation to FIGS. 11 and 12.

Figure 10:
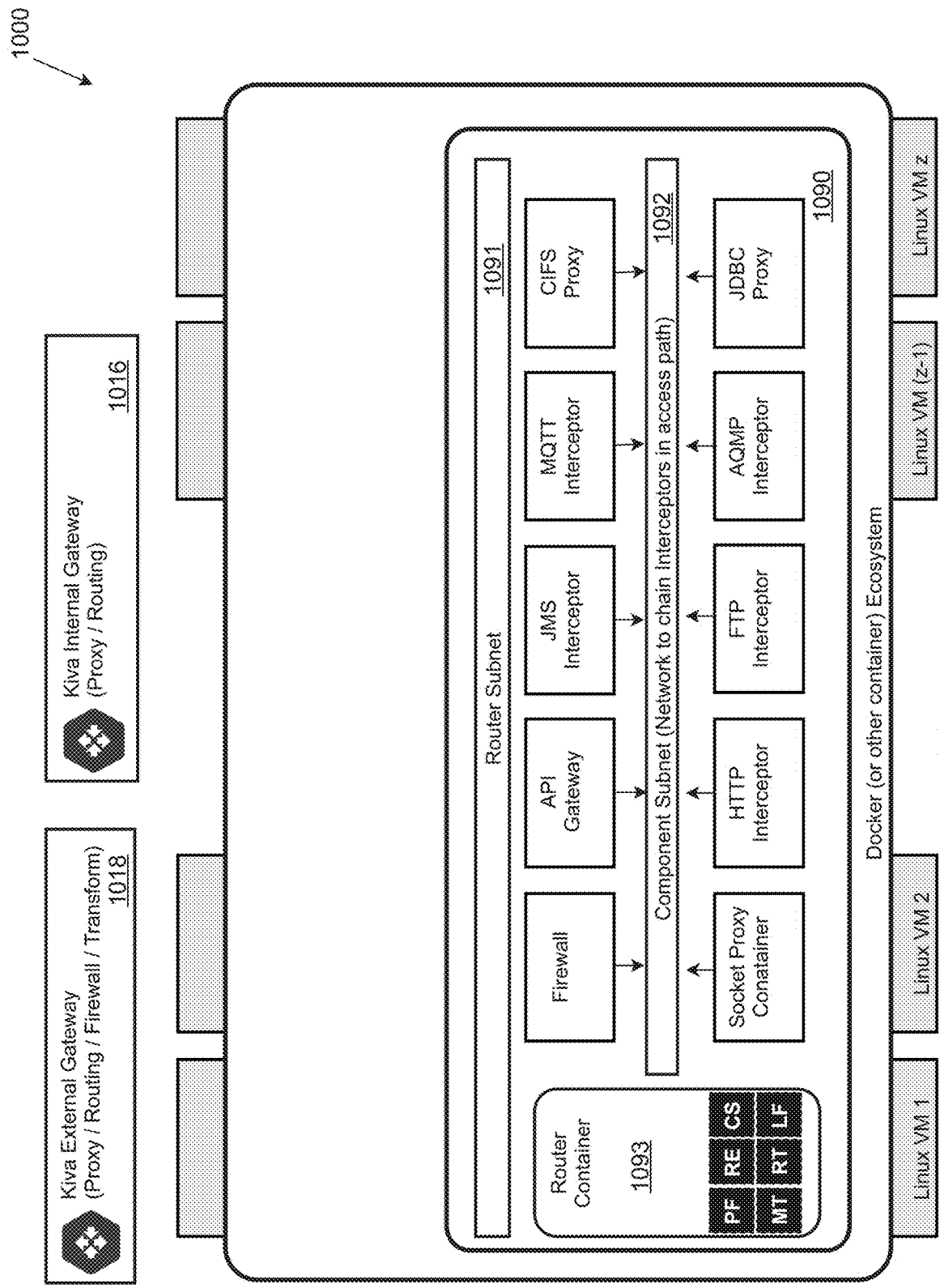
FIG. 10 shows the implementation of an example gateway referenced herein such as the internal-gateway and/or external-gateway of FIGS. 1 and 10, respectively.

By comparison, the component-subnet 992 of the illustrated building-block implemented system-component 990 is internally facing and is for coupling components and/or elements internal to the block of system-component 990 to each other, as shown in FIG. 10, for example. FIG. 10 further illustrates the building-block of FIG. 9 configured for use as a gateway 1090 such as the internal-gateway 116, 1016 and/or the external-gateway 118, 1018 of FIGS. 1 and 10, respectively, and/or one or more of the gateways of the other figures described herein.

In particular instances, the subnets of FIG. 9 (e.g., the router-subnet 991 and/or the component-subnet 992) are implemented as virtual isolated-type networks that are partially or fully software-based, providing scalability gains, as dozens, hundreds or thousands of network-components, system-components and/or system-elements are advantageously assembled into, for example, the system 100 of FIG. 1. In a particular implementation, the system 100 comprises an isolated environment, e.g., a process-module 102 for processes 134 and/or data-module 104 for source-data, results-data and/or other data, which is a novel approach to network-based systems architecture.

As used herein an environment refers to one or more groups of modules that may be isolated from each other; and hence the environments may be isolated from each other.

A module includes process module(s) and/or data module(s). Each module contains or is formed by one or more system-component(s).

A system-component is part of a module. The system-components are formed by using a base building-block 990 (see e.g., FIG. 9) that is constructed by using one or more virtual machines and/or one or more container(s) or container system(s), such as Linux VMs and/or Docker container(s), for example.

A system-element is a piece of a system-component that may be implemented and/or instantiated internal or external to the system-component. Some examples of internal system-elements are shown in FIG. 10: e.g., HTTP Interceptor, FTP Interceptor; AQMP Interceptor, Socket Proxy Container, JDBC Proxy, Firewall, API Gateway, JMS Interceptor, MQTT Interceptor, CIFS Proxy. Examples of external elements are described in relation to FIG. 12.

FIG. 10: Kiva Gateway Block

FIG. 10 shows the implementation of an example gateway referenced herein such as the internal-gateway 116, 1016 and external-gateway 118, 1018 of FIGS. 1 and 10, respectively. As shown in this figure, the gateway system-component 1090 in this case, is implemented within a system 1000 having a container-type ecosystem of one or more virtual machines (VM), which in this case include Linux-type VMs. The gateway system-component 1090 of the illustrated embodiment 1090 is implemented by using the atomic building-block 990 of FIG. 9. The gateway-block 1090 of FIG. 10 provides an isolation mechanism between, for example, the source-data submodule(s) 120 and/or the results-data submodules 122 of FIG. 1. The gateway-block 1090 may further provide the opportunity for various additional networking or data transformation functionality to be used on data-packets as the data-packets move through the gateway 1090 of FIG. 10 to their destination.

As illustrated in FIG. 10, the gateway 1090 includes a router-subnet 1091, a component-subnet 1092, and a router-container 1093.

The router-container 1093 includes a programming and/or messaging framework (MT), a basic-router (RT), a logging-framework (LF), a plugin-framework (PF), a rules-engine (RE), and a configuration-storage (CS). The foregoing are described in relation to FIG. 9.

The gateway 1090 provides gateway-type services including, for example, proxy, routing, firewall, and/or transform type services. To perform such services for the system 1000, the component-subnet 1092 provides a network to chain and/or link interceptors and other system-elements and/or system-components in an access path. For instance, as shown in FIG. 10, the component-subnet 1092 operatively couples to illustrations for one or more Firewall, API Gateway, JMS Interceptor, MQTT Interceptor, CIFS Proxy, Socket Proxy Container, HTTP Interceptor, FTP Interceptor, AQMP Interceptor, and/or JDBC Proxy. In some embodiments, these features and functions of the gateway-block 1090 implement various Kiva Policies (e.g., 714 and 814 of FIGS. 7-8), as data enters and exits the inbound-data submodules and outbound-data submodules of the data-modules (Kivas) of these embodiments. In particular embodiments, for each supported communication protocol (e.g., JMS, MQTT, etc.), there is a corresponding interceptor for intercepting and handling traffic for the protocol.

FIG. 11: Kiva Network Block

FIG. 11 shows the implementation 1190 of the various Kiva Network blocks in previous diagrams by using the Kiva Atomic Building-Block 990 of FIG. 9 for a system 1100. For instance the network-block 1190 of various configurations includes one or more of an inbound-data network 1106, source-process network 1108, inter-process network 1110, results-network 1112, and/or outbound-data network 1114. One or more of these networks are optionally configured to be isolated-type networks. Hence, an advantageous function of the example network-block 1190 of FIG. 11 is to provide isolation between and/or for various submodules such as the source-data submodules 120 and/or the results-data submodules 122 of FIG. 1, and to provide isolation such as from the outside world or from other modules and/or submodules. In FIG. 11, one potential configuration is illustrated showing the coupling of one network-block's router-container 1183 of a system-component 1180 to a separate network-block's 1190 router-subnet 1191, and vice versa, the router-container 1193 of the network-block 1190 is shown coupling to router-container 1171 of a network-block for another system-component 1170.

As Kivas (system modules and/or submodules) are generated and/or instantiated, based upon the processes and data involved and the Kiva policy (see e.g., FIGS. 7-8), the appropriate interceptor 1194 is added to the network-block 1190 to allow the desired level of access between different Kivas (system modules and/or submodules). As another example, one or more interceptors 1194 of the network-block 1190 of FIG. 11 may selectively operate upon specific network traffic to provide isolation and/or performance enhancement for the illustrated network-block 1190. An added or instantiated interceptor 1194 may for instance intercept, drop and/or block selected packets of network traffic to allow access or operations with the network-block 1190 or alternatively provide isolation for the network-block 1190 and/or associated process-modules 102, 202, . . . x02 or process-submodules 125, 225, . . . x25 and/or data-modules 104, 204, . . . x04 or data-submodules 120, 122, x20, x22 of the system 100 environment of FIGS. 1, 2, and/or . . . x00 of other Figures.

Figure 12:
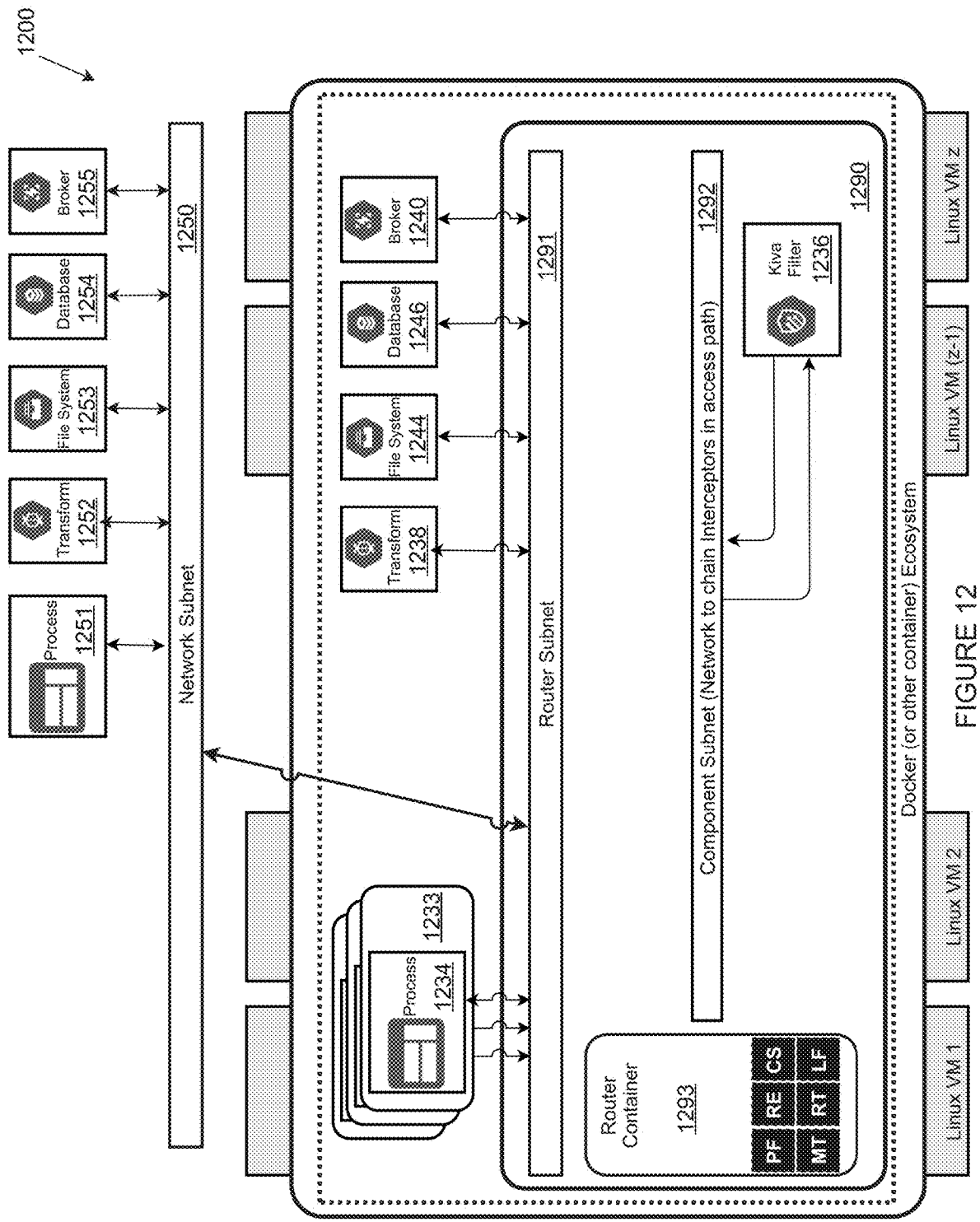
FIG. 12 shows the implementation of a system-component for a system and further illustrates various example Kiva-related system-elements and how the illustrated system-elements couple to the system-component.

FIG. 12: Kiva Elements

FIG. 12 shows the implementation of a system-component 1290 for a system 1200 and further illustrates various example Kiva-related system-elements (e.g., file-system, database, filter, transform, and/or broker) and how the illustrated system-elements couple to the system component 1290. In an implementation, the system component 1290 is implemented by using the Kiva building-block 990 of FIG. 9. As shown in FIG. 12, the system-elements of FIG. 12 include one or more process-containers 1233 having one or more process 1234, a transform 1238, file-system 1244, database (DB) 1246, and/or a broker 1240. Also shown in FIG. 12, some internal Kiva-related system-elements are implemented within the same Kiva Ecosystem such as the Docker Ecosystem 1200 of FIG. 12, while some external Kiva-related system-elements are implemented for a separate container, separate virtual machine, and/or separate physical server; which are separated by using a network-subnet 1250 from the internal system-elements of the illustrated Kiva Ecosystem 1200. In FIG. 12, the system-elements that are external to the system 1200 include process 1251, transform 1252, file-system 1253, database (DB) 1254, and/or broker 1255. The Kiva-related system-elements may further be third party software elements. For instance, a database element may be an Oracle-type and/or Microsoft SQL-type database that is implemented either internally and/or externally to the Docker Ecosystem 1200 of FIG. 12. The network-subnet 1250 of some implementations optionally includes an isolated-type subnet as previously described.

As shown in FIG. 12 and previously described in relation to FIG. 9, internal system-elements may be coupled together by using the component-subnet 1292 of the illustrated system-component 1290. External system-elements that are external to the system-component 1290 may require a router-subnet 1291 to be coupled. Moreover, external system-elements that are external to the system-component 1290 and external to the illustrated system 1200 (e.g., in this case includes a Linux VM-Docker implementation 1200) may require a network-subnet 1250 to be coupled. The Kiva-related internal and/or external system-elements of FIG. 12 may be coupled via the macvlan, cloud-provider software defined network (SDN), e.g., networking stack provided by Amazon Web Services and/or Microsoft Azure, or similar network driver, and a Kiva Filter 1293 block is used if needed to provide inspection of any data that is routed to and from these system-elements of the component 1290. As known in the art, certain cloud providers may block macvlan and require the use of the cloud provider's proprietary networking stack to interface with the cloud provider. Hence, some embodiments advantageously allow for interfacing the system of these embodiments to such restrictive cloud providers.

In FIG. 12, the network-subnet 1250 allows for the system-component 1290 and the system 1200 to securely employ or make available additional services provided by system-elements that are not internal to the system-component 1290, but that reside external to the system-component 1290.

Figure 13:
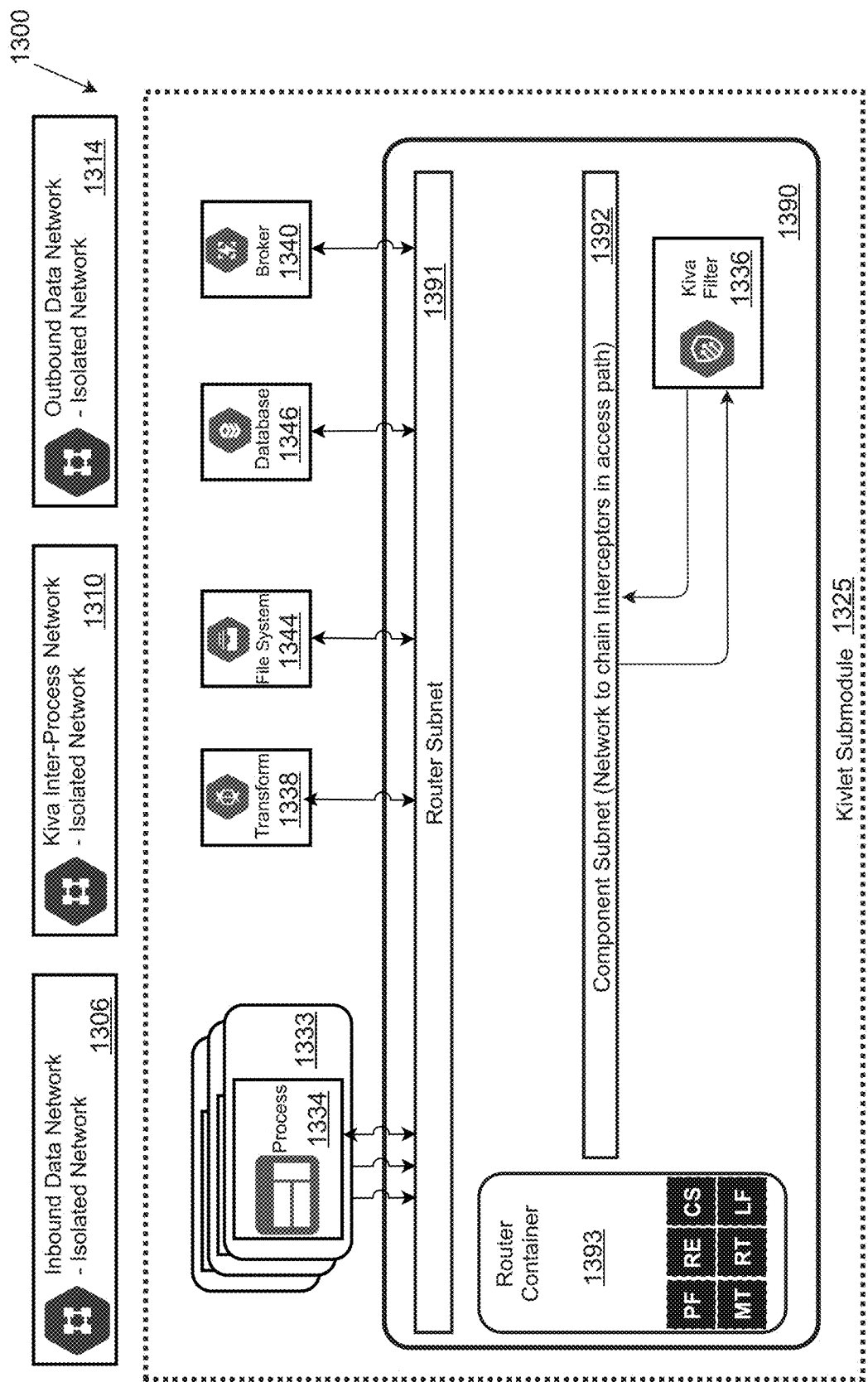
FIG. 13 illustrates a Kivlet (e.g., data and/or process) submodule in accordance with some embodiments.

FIG. 13 illustrates an example Kivlet cell or submodule 1325 in accordance with some embodiments. For instance, the submodule 1325 may implement the process-submodule 125 and data-submodules (or Kivlets) 120 and 122 of FIG. 1. In some embodiments, the building-block 990 of FIG. 9 is used to construct the functional submodule 1325. As shown in FIG. 13, the submodule 1325 includes one or more processes 1334 instantiated within a memory address space or node 1333. The node 1333 of a particular embodiment is implemented by using an isolated memory address space, and hence the node 1333 is memory-isolated, process-isolated and/or network-isolated such that the processes 1334 inside the node 1333 are unable to access any data or other processes 1334 outside of the submodule 1325, except by using virtual network segments 1306, 1310, 1314. In an embodiment, these virtual network segments correspond to the networks 106, 110 and 114 of FIG. 1, and may be isolated-type networks.

Similarly, processes 1334 and/or data inside the (process-container) node 1333 are inaccessible from outside of the submodule 1325, except by using a virtual network segment 1306, 1310, 1314. In these embodiments, the node 1333 implements a protected process-container 1333 for the processes 1334. In order to maintain the protection of the processes 1334 within, one or more virtual network segment(s) 1306, 1310 and/or 1314 may use processes 1334 only within the protected process-container or node 1333.

In some embodiments, the only network connections to the node 1333 are temporary, and/or are implemented by virtual network segments 1306, 1310, 1314.

Accordingly, the system 100, . . . x00 of embodiments herein advantageously use virtual network segments 1306, 1310, 1314 to selectively access components of a submodule 1325. The virtual network segments 1306, 1310, 1314 allow processes 1334 to communicate in a controlled manner with specific external objects that have need for the processes 1334.

The submodule 1325 and some and/or all of the system modules, submodules, system-components, and/or system-elements are optionally configured for automatic and dynamic instantiation, generation, configuration and/or destruction. Hence, the systems 100, . . . x00 described herein constructed by using the submodule 1325 are also advantageously dynamically instantiated, generated, configured and/or disassembled, system component-by-component and/or system element-by-element, which limits the potential for undesirable malicious or erroneous human interference. For instance, the time window of exposure for data leakage is limited. Moreover, the isolation and one-way filtering described herein also limits the points of attack for undesirable intrusion and/or data leakage.

After a system (e.g., 100 . . . x00) is instantiated by using building-blocks (of FIGS. 9 through 12) or submodules 1325 (of FIG. 13), delivery of results, and/or deletion of the instantiated system (e.g., 100 . . . x00), and/or one or more of the cells 1325 that were used for a first analysis operation run, one or more iterative analysis operations or processes may also be run. Additional iterations may be performed with or without modification of any of the datasets involved in the first analysis operation run including source-data, results-data and/or another data. The system (100) for additional iterations in some cases is implemented by replicating the first dynamic instantiation of some or all of the first system 100. Any new modification steps are optionally appended to each iteration of the system 100. Instead of permanently storing results, some embodiments keep a record of a step by step process to go from source data to results. These embodiments advantageously store and retrieve a recipe for system 100 instantiation instead of any particular result, data, and/or output of the system 100. Moreover, one or more entire system(s) are advantageously generated, instantiated, dis-assembled and/or destroyed quickly and efficiently, on demand, and as needed.

Figure 14:
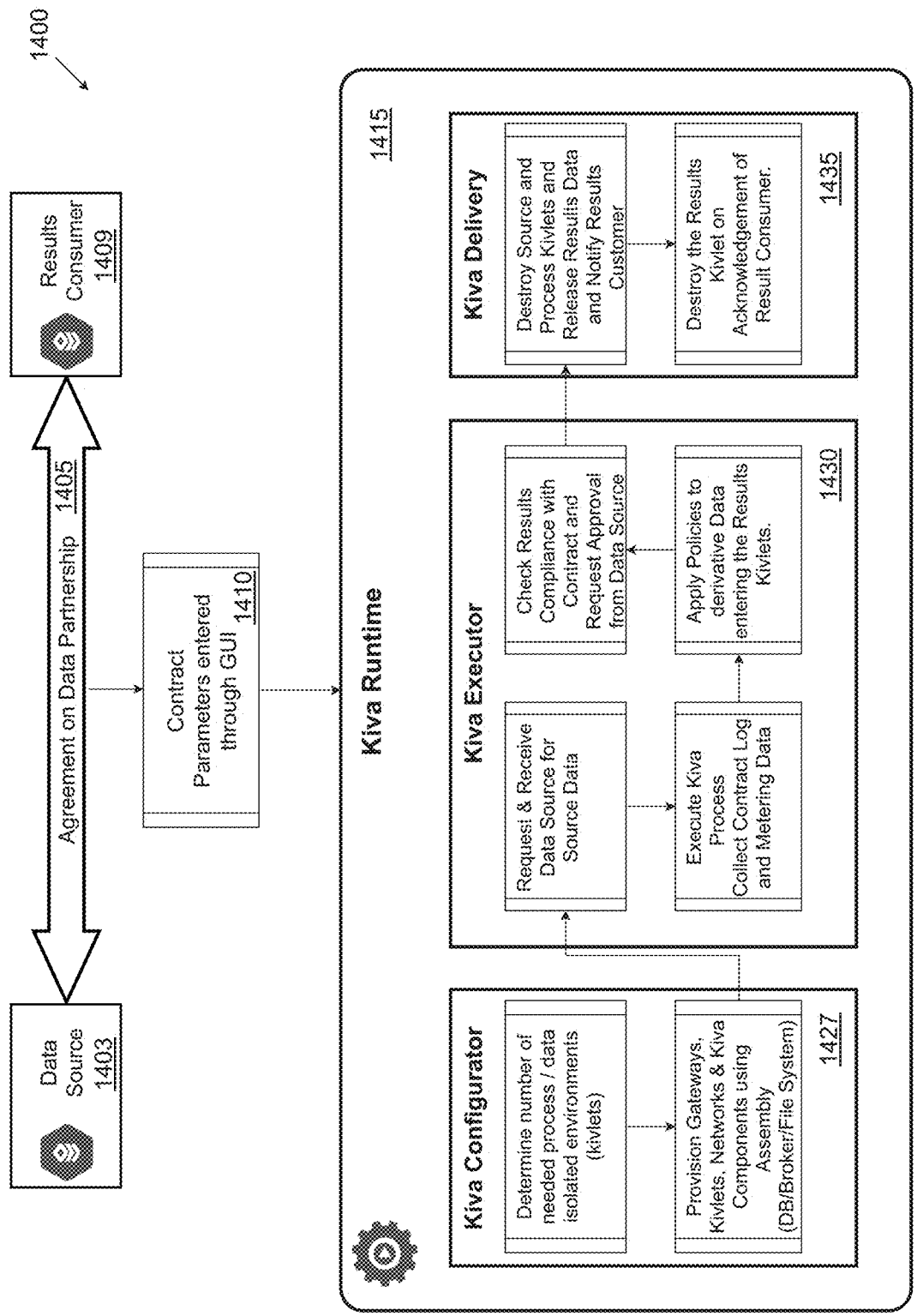
FIG. 14 illustrates a method in accordance with some embodiments.

FIG. 14 illustrates a method 1400 in accordance with some embodiments. As shown in this figure, the method 1400 begins at a method step 1405 where a requestor 1409 such as a results-participant and/or device has need for results, data and/or processing from a data-source 1403. At the step 1405, the requestor 1409 and the data-source 1403 may negotiate, transact, and/or reach one or more agreement(s). Then, the method 1400 transitions to the step 1410, where one or more contract(s) are formed based upon the output of the step 1405 and the determined requirements of the requestor 1409 and source 1403 entities. The contract comprises a set of parameters which may be used to instantiate the system 100 of some embodiments. In an example case, the parameters are entered into a graphical-type user interface (GUI) such as those illustrated and described in relation to FIGS. 21-22, for instantiation into system implementations and/or iterations of said system, e.g., system 100 . . . x00.

After the step 1410 of FIG. 14, the method 1400 transitions to step/phase 1415, where the Kiva Runtime system proceeds through the configuration sub-phase (for System-Configurator 1427), the execution sub-phase (for Kiva Executor 1430) and the delivery sub-phase (for Kiva Delivery 1435), of the Runtime phase 1415.

Within the System-Configurator subphase 1427, the System-Configurator determines the number of necessary process and/or data modules and/or submodules, and instantiates and/or configures those specified modules and/or submodules including one or more appropriate process(es), e.g., processes 634 of FIG. 6. The foregoing may be implemented for an embodiment such as the embodiment shown in FIG. 1 as system 100.

After the Kiva-Configurator subphase 1427, the method 1400 transitions to step 1430 (System-Executor subphase), where the system 100 requests and receives the specified data, executes the configured and instantiated process(es) upon the requested data, applies the appropriate policies to the derived results data, and checks the compliance of the results data with the contract and requests approval for release of the results from the data-source. In some embodiments, the data, processing, and/or results provided and/or made available to the requestor 1409 may include minimal processing or alteration such that the output or results-data is substantially similar to the source-data. Alternatively, the output, data, processing, and/or results comprises significantly modified or processed data and/or results. The method 1400 may perform multiple iterations of all or a portion of the method 1400 at the step 1430. Alternatively, the method 1400 returns to any previous step of the method 1400 and iterates from that step.

Once one or more iterations are sufficiently performed at the System-Executor step 1430, the method 1400 then transitions to step 1435 (System-Delivery) where the desired results are released to the source 1403 and/or requestor 1409 entities. Once the requestor 1409 entity has acknowledged receipt of the requested data, processing, and/or results, any system 100 instantiations are optionally disassembled and/or destroyed and the method 1400 concludes.

Figure 15:
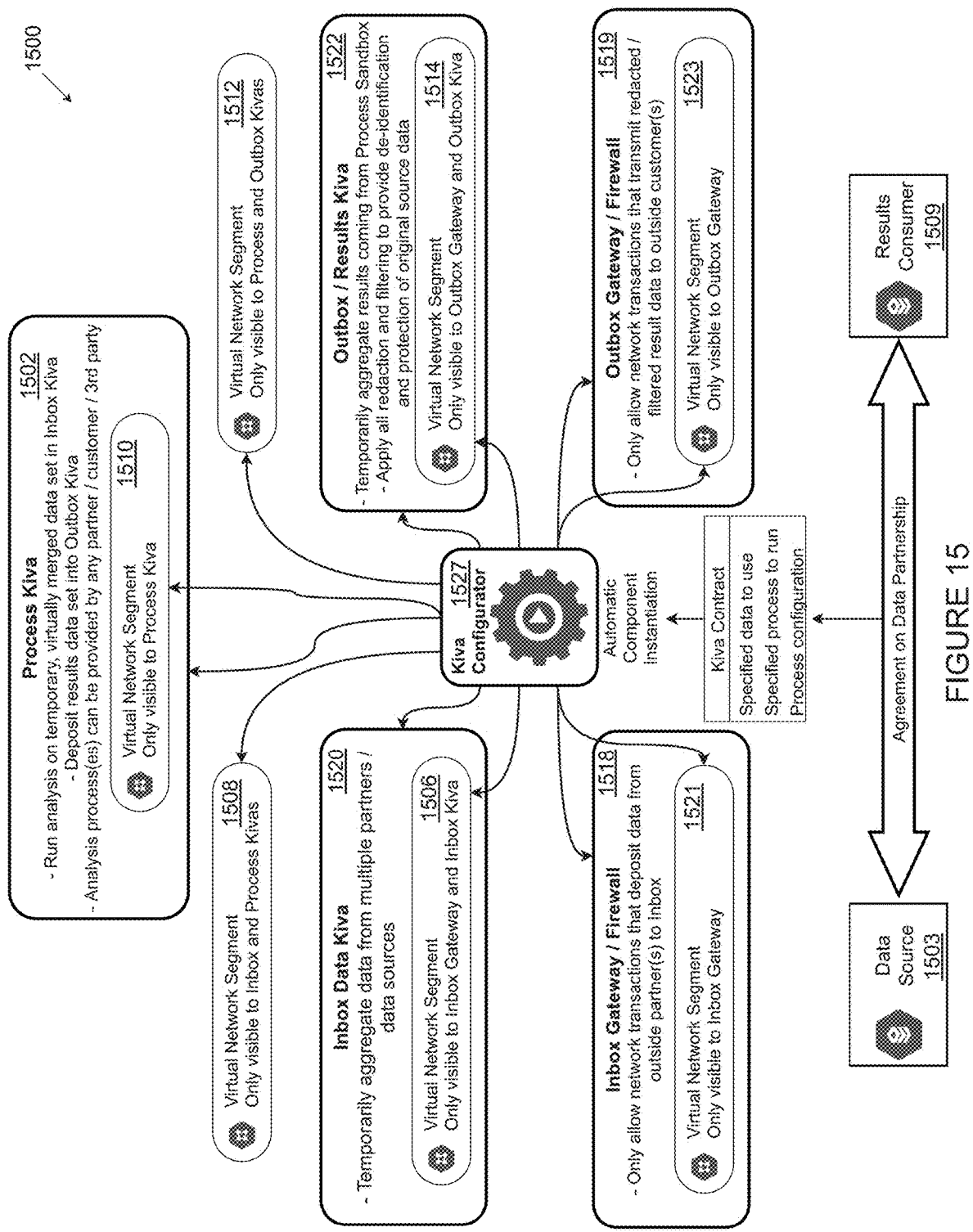
FIG. 15 illustrates further detail of an automated Kiva system instantiation in response to the needs of the source and/or requestor entity and/or device in relation to the method steps of FIG. 14.

FIG. 15 illustrates further detail of an automated Kiva system instantiation 1500 in response to the needs of the source 1503 and/or requestor 1509 entity and/or device in relation to the method 1400 steps of FIG. 14. As shown in FIG. 15, the system 1500 includes a system-configurator 1527, a process-module 1502, an inbox (source-data) submodule 1520, an outbox (results-data) submodule 1522, an inbound-gateway 1518, and outbound-gateway 1519, and virtual network segments 1506, 1508, 1510, 1512, 1514 1521 and 1523. In this example, the inbox (source-data) submodule 1520 is instantiated and/or housed separately from the outbox (results-data) submodule 1522. Also, the inbox-gateway 1518 is instantiated and/or housed separately from the outbox-gateway 1519. As shown in FIG. 1, these system 100 components are alternatively instantiated and/or housed within a single module and/or submodule such as the data-module 104 for the inbox-submodule 1520 and the outbox-submodule 1522. Similarly, the inbox-gateway 1518 and outbox-gateway 1519 may be implemented by two gateways as shown in FIG. 15, or alternatively may be implemented by a single gateway such as the external-gateway 118 of FIG. 1.

Also shown in FIG. 15, the system 1500 by using the system-configurator 1527 automatically instantiates the foregoing system-components including process-module 1502, and each of the virtual network segments 1506, 1508, 1510, 1512, 1514, 1521, 1523. Each instantiated component has a function as described herein (e.g., in relation to FIG. 1), and is preferably instantiated by using a set of predetermined parameters such as the parameters of FIG. 14. For instance, the process-module 1502 corresponds to the process-module 302 of FIG. 3, which may provide analysis runs upon temporary, virtually merged dataset(s) within the inbox-submodule 1520, and/or may deposit results-data into the outbox-submodule 1522. The analyses are provided by one or more processes that are provided and/or prescribed by a participant or data-partner. In another instance, the virtual network segment 1506 corresponds to the inbound-data network 306 of FIG. 3, and is an isolated-type network which in conjunction with the virtual network segment 1521 and the inbox-gateway 1518 to only allow network activity that deposits permissible data from external source-data devices 1503 into and/or intended for the inbox-submodule 1520.

Similarly, after processing by the process-module 1502, only appropriate results-data are provided to the results-participant device 1509, by virtue of the operation of the virtual network segment 1510 for the process-module 1502 in conjunction with the virtual network segment 1512 for the output of the process-module 1502 to the outbox-submodule 1522; and/or by the operation of the virtual network segment 1514 for the outbox-submodule 1522, in conjunction with the virtual network segment 1523 for the outbox-gateway 1519. Each and/or all of the system-components in this FIG. 15, advantageously provides processes, services, and/or isolation to the data-source 1503 and/or results-participant devices.

Figure 16:
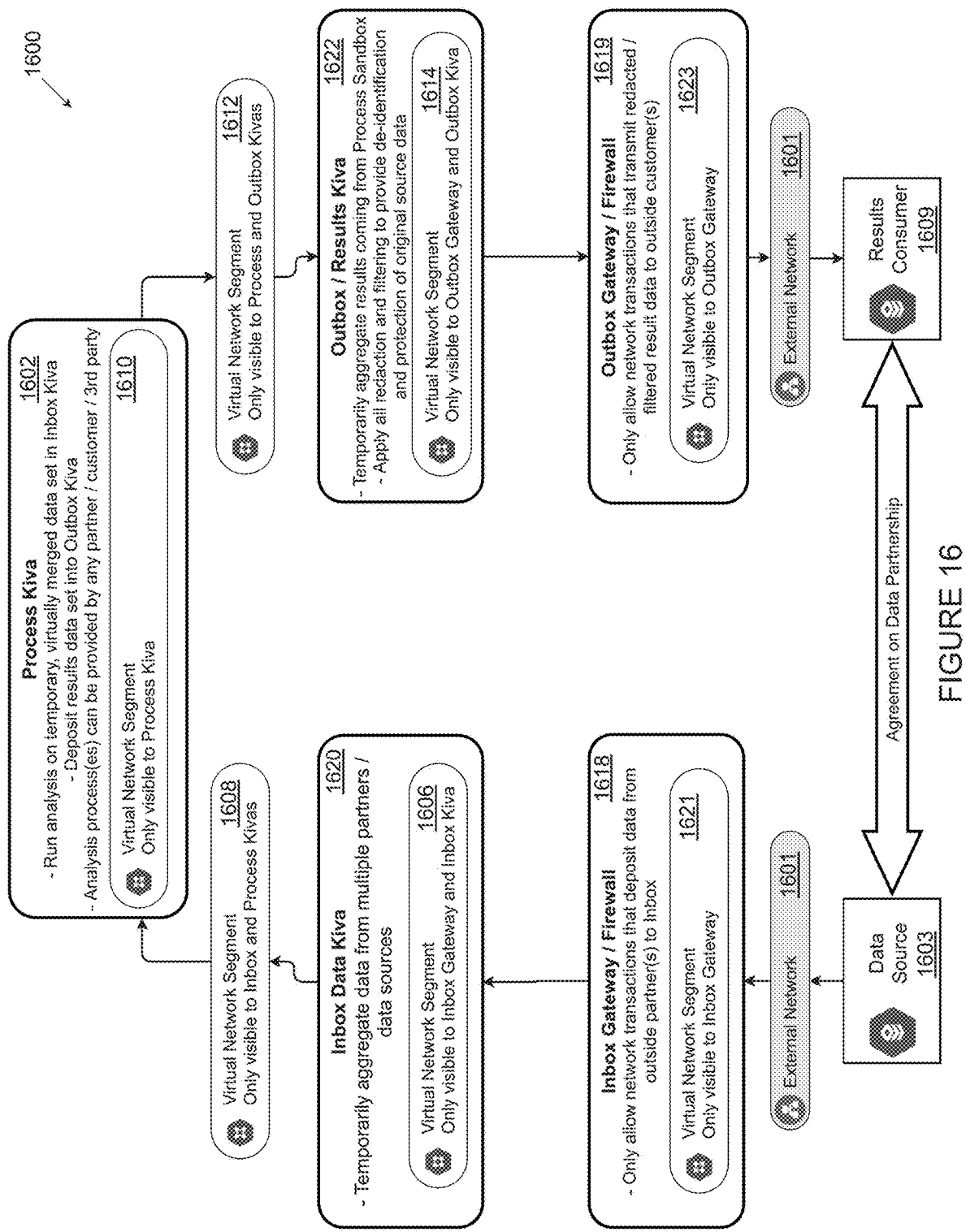
FIG. 16 illustrates a Kiva system instantiation (e.g., the system instantiation of FIG. 15) in operation.

FIG. 16 illustrates a Kiva system instantiation 1600 in operation. The instantiation 1600 is optionally configured by using predetermined parameters such as the parameters described in relation to FIG. 14. As shown in FIG. 16, source-data flows from a source participant device 1603 to external network 1601 where the source-data is selectively allowed to enter the inbox-submodule 1620 only by using inbox-gateway 1618 having virtual network segment 1621, and/or by virtual network segment 1606.

Source-data that are allowed into the inbox-submodule 1620 are selectively accessed by the process-module 1602. The access is preferably only via the virtual network segment 1608 and/or the virtual network segment 1610 for the process-module 1602. Within the process-module 1602, the source-data may be transformed into results-data that may be selectively output to the outbox-submodule 1622. In an embodiment, the selective output from the process-module 1602 to the outbox-submodule 1622 is only via the virtual network segment 1612 and/or by virtual network segment 1610 for the process-module 1602, and through no other means. Results-data that are allowed into the outbox-submodule 1622 may be selectively made available to one or more results-participant device(s) 1609 via the external network 1601. In particular embodiments, such access to the results-data is only permitted via virtual network segment 1614 and/or outbox-gateway 1619 having virtual network segment 1623.

The system and/or instantiation 1600 may be employed multiple times for multiple datasets and/or multiple participants 1603 and 1609 that may include the same entities, different entities or a combination thereof. When the system and/or instantiation 1600 is no longer needed, the system 1600 is disassembled and/or destroyed. In particular embodiments, a set of instructions and/or parameters is saved for how to re-implement and/or re-instantiate the system 1600 such that the system 1600 is re-constructed quickly for the same, different, related and/or similar processing as before. In these embodiments, the actual data and results are not saved and only the system assembly-plan and/or instructions including any necessary parameters, are saved. Hence, particular details within the data such as PII, and/or relating to any prior participant(s) or contracts are isolated and not kept from one system generation and/or instantiation to the next.

Figure 17A:
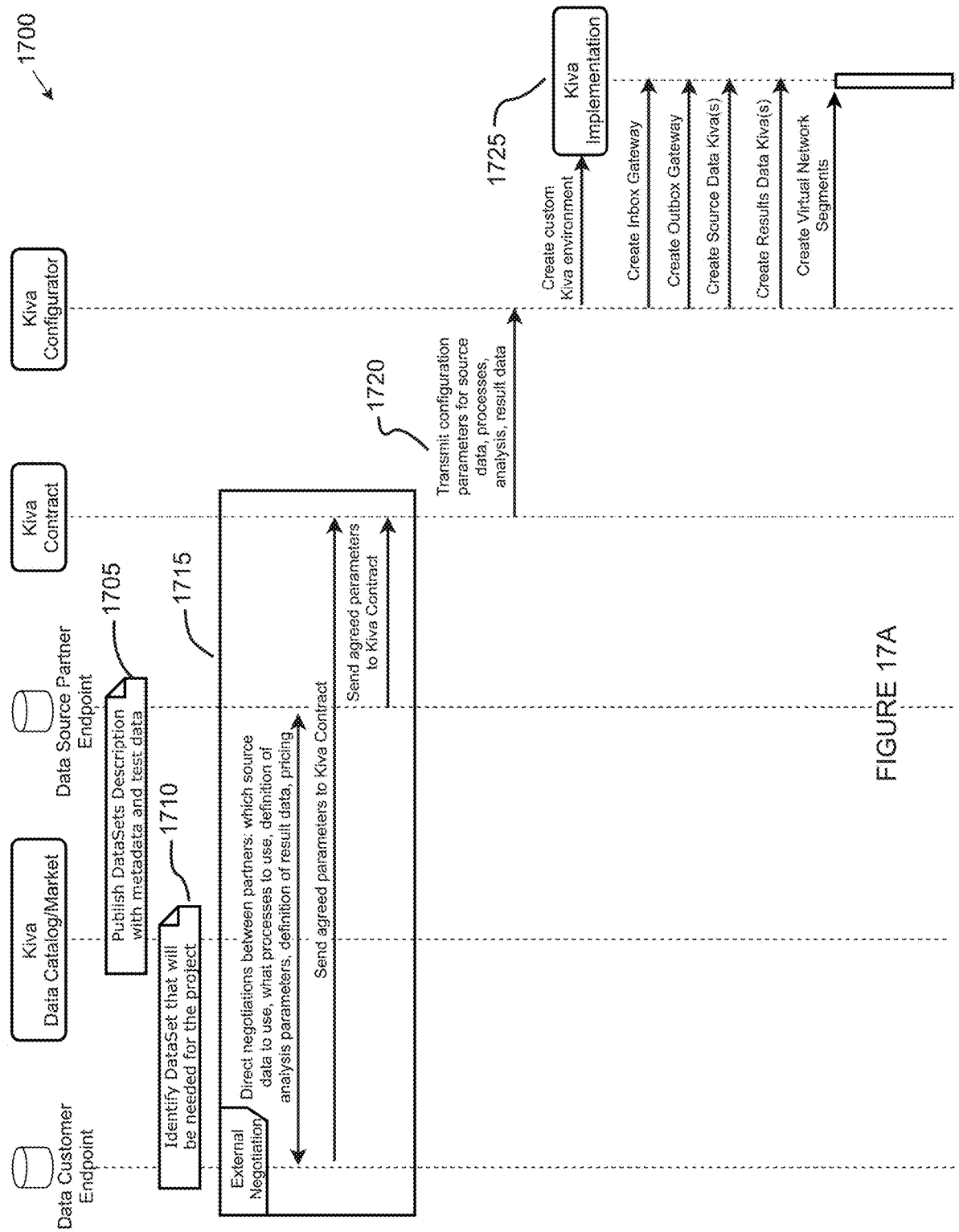
FIGS. 17A-17B are referred to collectively herein as "FIG. 17.
Figure 17B:
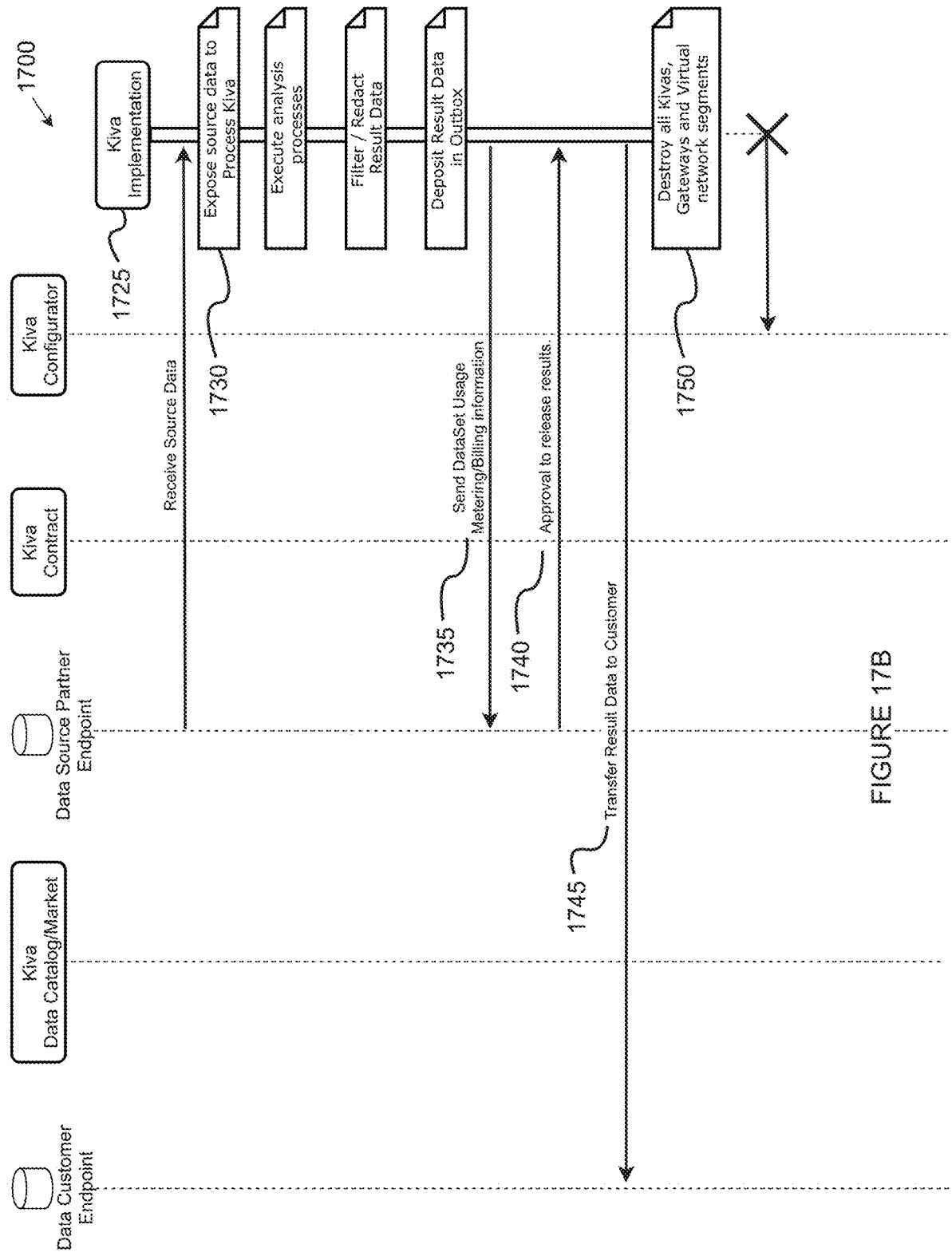
Figure 18A:
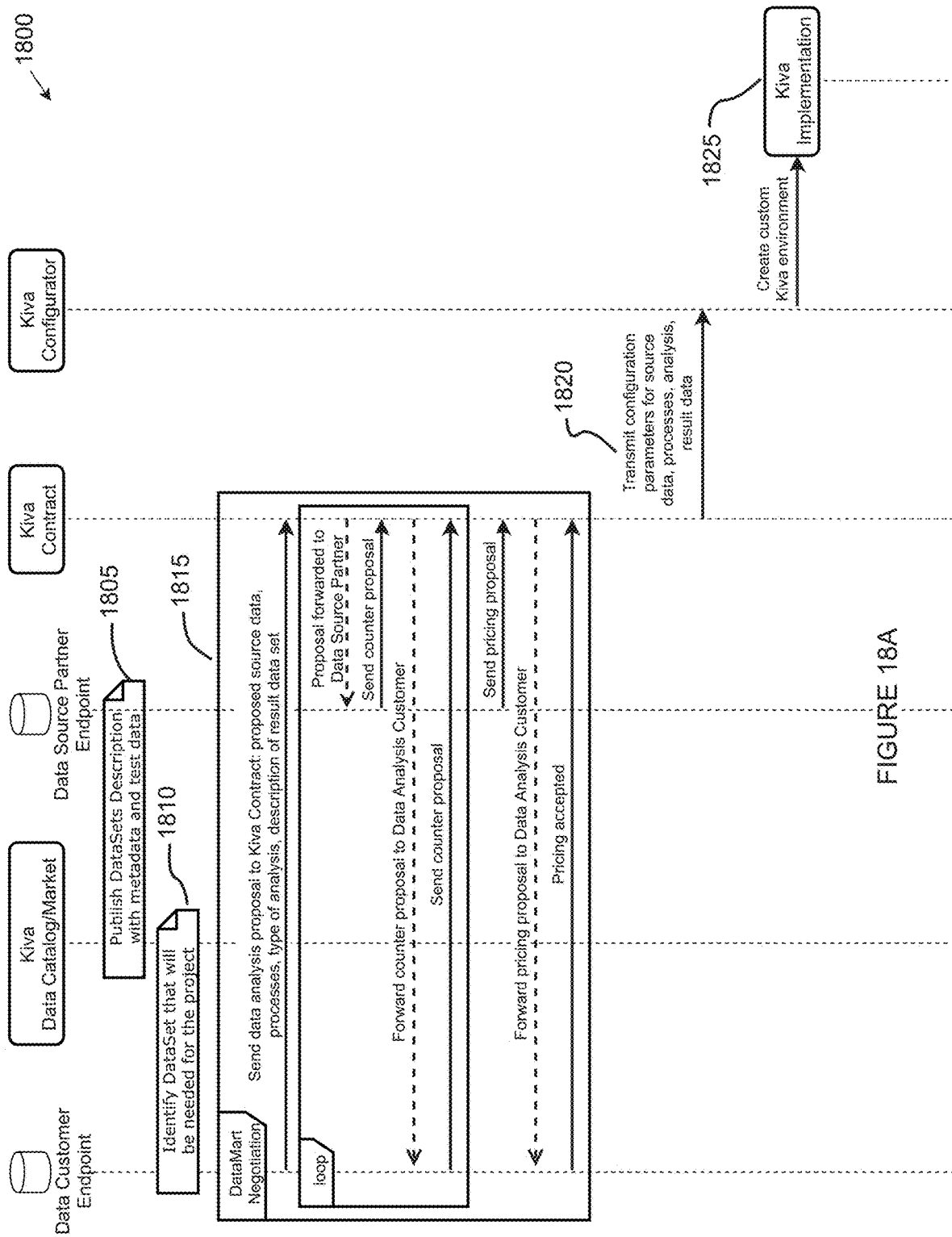
FIGS. 18A-18B are referred to collectively herein as "FIG. 18.
Figure 18B:
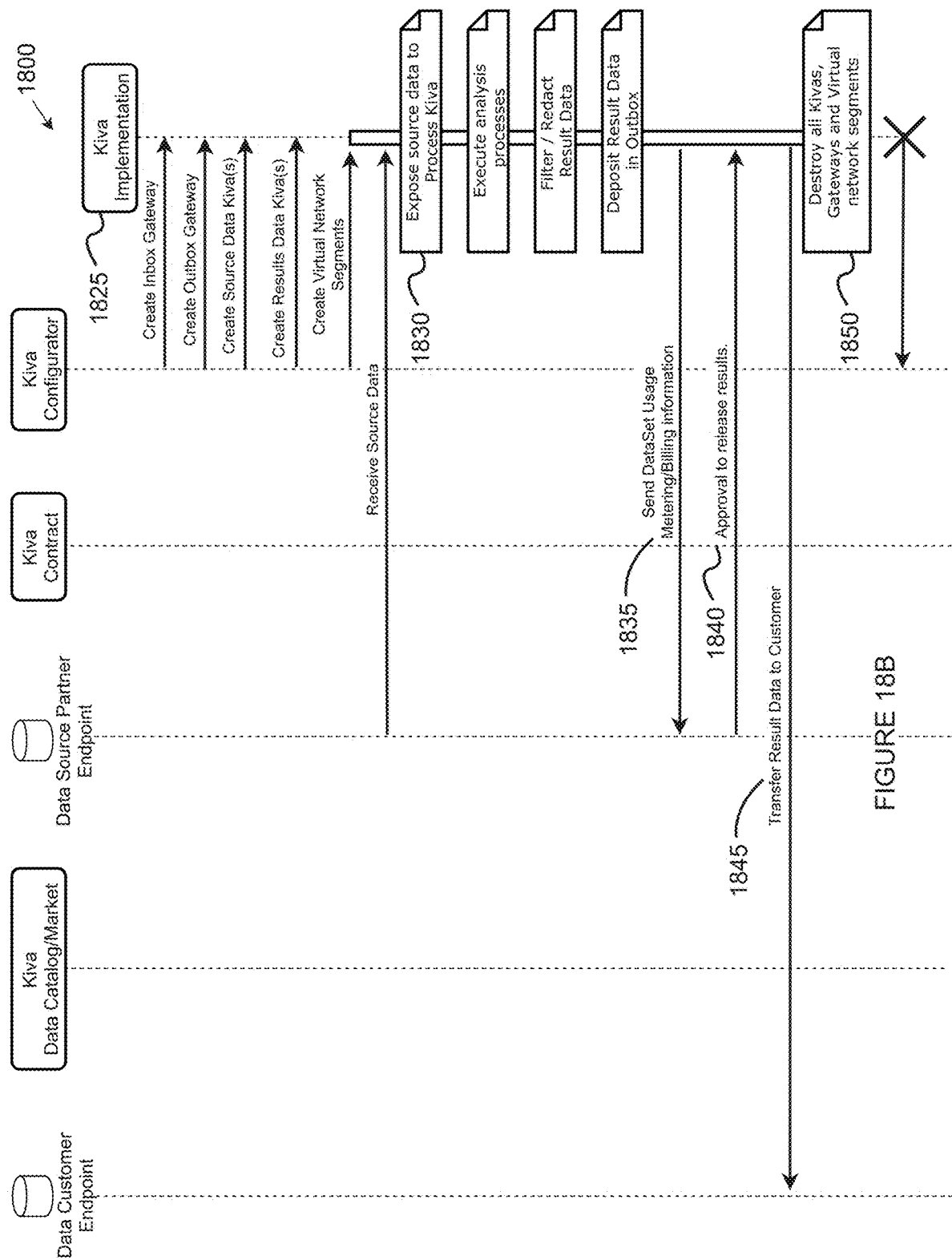

FIGS. 17A and 17B are referred to herein collectively as "FIG. 17," and FIGS. 18A and 18B are referred to herein collectively as "FIG. 18." FIG. 17 (17A-17B) and FIG. 18 (18A-18B) include timing diagrams that illustrate a sequential representation of a Kiva-based interaction.

FIG. 17 Example System Life Cycle 1700 of Kiva System Generated in Response to Request from External Negotiation FIG. 17 shows an example sequence of events that occur in an interaction between two participants when those events are triggered by a direct negotiation between the participants to agree upon a specific use of a dataset from the source-data participant device by the recipient and/or results-data participant device. As shown in this FIG. 17, the system lifecycle 1700 begins at a step or phase 1705, where the source-data device publishes descriptions of the various datasets to which it is configured to provide access to a Data-Market. The descriptions include metadata describing the various columns within the data set, and possible sample test data. At phase 1710, a potential data-requestor then browses through the available datasets in a Data-Market, and identifies the dataset(s) that the data-recipient needs for a specific project. At phase 1715, the source-participant and the potential recipient negotiate and/or predetermine a number of parameters including what subset of the desired dataset is going to be made available and/or used, what processes are acceptable for use upon the data, how the selected processes are allowed to manipulate the data, what is permissible for the results data set, and what, if any, filtering, redaction, or anonymization must be performed upon the results-data before the data are released to the data-recipient.

At phase 1720, the parameters agreed to by this negotiation, including an assembly sequence describing the interconnection and sequencing of the various data and process components, are then transmitted into one or more Kiva Contract objects. The Kiva Contract objects represent a specific, agreed-upon interaction of source data and processes that generate a results-dataset. This is then used to generate a Kiva System Assembly-Plan (see e.g., FIGS. 7-8), which is passed to a Kiva System-Configurator (see e.g., FIG. 15) at phase 1725. An assembly sequence in accordance with certain embodiments is illustrated and described in relation to FIGS. 21 and 22.

The Kiva System-Configurator at phase 1725, then takes the parameters and assembly sequence, and uses those to determine: how many, and what types of Kiva systems, modules, submodules, components and/or elements need to be generated to fulfill a specific Kiva contract; how the foregoing systems, components and/or elements need to be interconnected; the specific dataset or process(es) that need to populate each Kiva system and/or module; the parameters used to configure each Kiva system and/or module; the sequence by which the data flows from system component to system component; any filtering, redaction or anonymization that needs to be applied before the data reaches the final results-submodule(s) for the recipient of the results-data.

Once the system instantiation has been dynamically instantiated, generated and/or assembled, the source-data is introduced as an input at phase 1730, and the data flows through the system (e.g., see FIGS. 1, and 15-16) until it has been properly filtered and deposited in a results-submodule for the instantiated system. Then at phase 1735 the appropriate metering, billing and audit log information is recorded to properly track the transaction that has just been executed. At phase 1740, final approval to release the results is requested from the source-data device or endpoint, and once that has been received, the results data are transferred to the results-data recipient at phase 1745, and all of the Kivas and interconnections are then deleted at phase 1750.

FIG. 18 Example Life Cycle 1800 of Kiva System Generated in Response to Request from Data Mart.

FIG. 18 is similar to FIG. 17 in its description of a specific example transaction 1800, however, within FIG. 18, once the results-recipient identifies the desirable dataset(s) to use from a Kiva DataMart at step or phase 1810, the negotiation between the results-data participant or device and the source-data participant or device is executed within the Kiva DataMart at phase 1815. Here at phase 1815, the proposed usage of the dataset is sent back and forth between the results-data participant, the source-data participant, and the DataMart until there is agreement from both sides. This usage proposal would include which subset of the source-data is needed, what type of processes is applicable to manipulate the source-data, and what the expected results-data set will look like. Once there is an agreement upon the usage of the data, pricing proposals are also exchanged through the DataMart until an agreement is reached on that front as well. In an embodiment, the foregoing steps are executed by using the interface illustrated and described in relation to FIGS. 21-22.

After the pricing has been established at phase 1815, the remainder of the transaction progresses in a similar fashion to the transaction shown in FIG. 17, with the parameters of the Kiva System-Contract (including the assembly plan and/or sequence) automatically extracted from both parties during the process of the Kiva DataMart negotiation. These parameters for each Kiva Contract are sent to the Kiva System Configurator at phase 1820 and the rest of the transaction 1800 executes as in the previous example (of FIG. 17).

Figure 19:
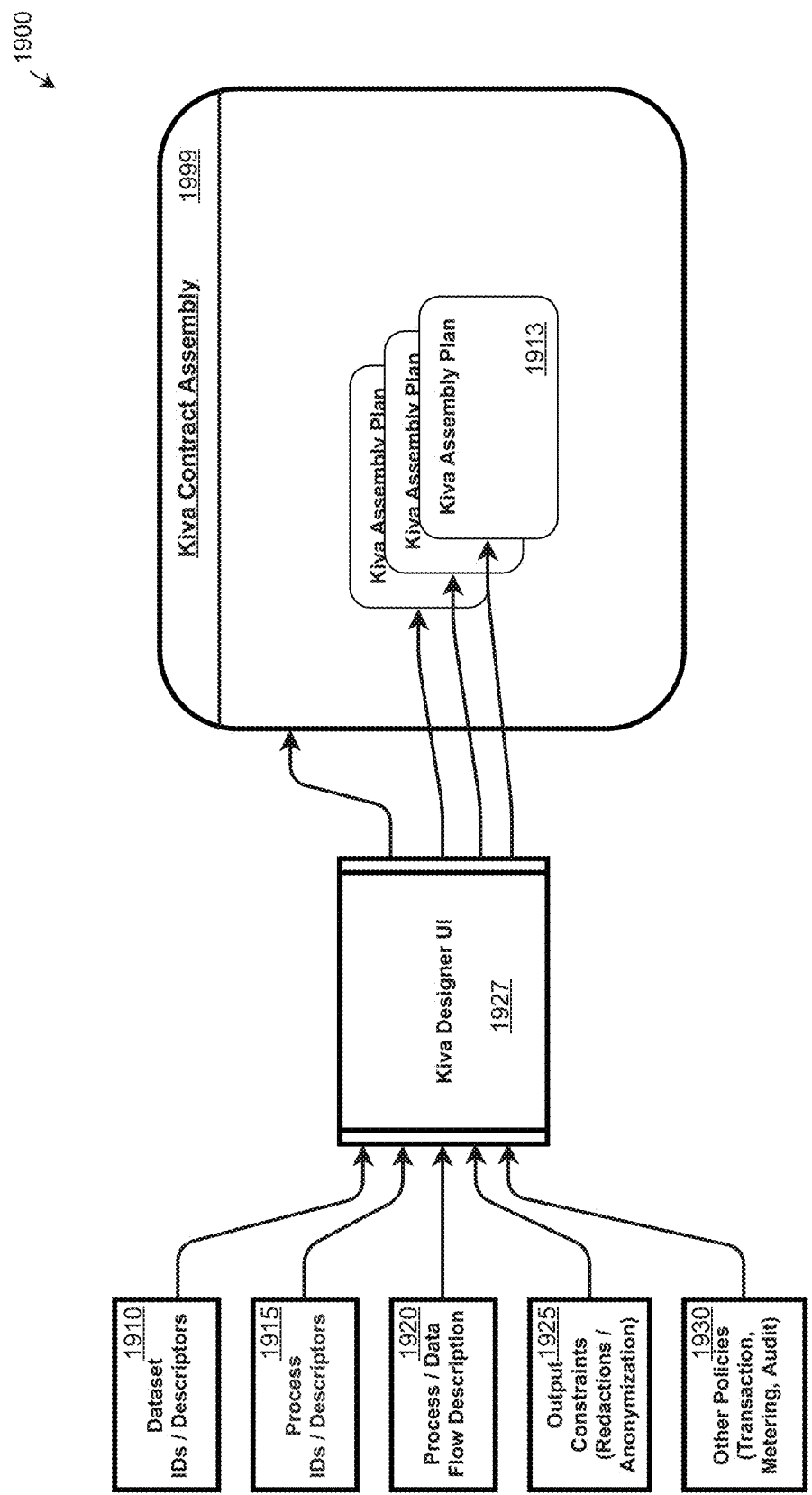
FIG. 19 depicts a method that is used by a particular implementation that takes input information from multiple data participants (e.g., of FIGS. 4 and 5), and transforms that information into a group of assembly plans that are automatically executed by a Kiva system-configurator to implement a Kiva system-contract.

The following algorithm and parameters corresponds to the implementation 1800 of FIG. 18 described above, and may further illustrate the embodiments described in relation to FIGS. 14 through 17:

title Example Kiva Life Cycle
    actor "Data Analysis Customer" as A
    participant "Kiva Data Catalog/Market" as Mart
    actor "Data Source Partner" as B
    participant "Kiva Contract" as Contract
    participant "Kiva Configurator" as Config
    participant "Kiva Implementation" as Kiva
    note over Mart,B: Publish DataSets Description with metadata and test data
    note over A,Mart: Identify DataSet that will be needed for the project
    note over A,B: External negotiation or Market Transaction on Kiva DataMart
    opt External negotiation
    A↔B: Direct negotiations between partners: which source data to use, what processes to use, definition of analysis parameters, definition of result data, pricing
    A→Contract: Send agreed parameters to Kiva Contract
    B→Contract: Send agreed parameters to Kiva Contract
    end
    note over A,B:OR: Negotiation through Kiva Contract Hub opt DataMart transaction
    A→Contract: Send data analysis proposal to Kiva Contract: proposed source data, processes, type of analysis, description of result data set loop
    Contract-→B: Proposal forwarded to Data Source Partner
    B→Contract: Send counter proposal
    Contract-→A: Forward counter proposal to\nData Analysis Customer
    B→Contract: Send counter proposal
    end
    B→Contract: Send pricing proposal
    Contract-→A: Forward pricing proposal
    A→Contract: Pricing Accepted
    end
    Contract→Config: Transmit configuration parameters for source data, processes, analysis, result data
    Config→*Kiva: Create custom Kiva environment
    Config→Kiva: Create Inbox Gateway
    Config→Kiva: Create Outbox Gateway
    Config→Kiva: Create Source Data Kiva(s)
    Config→Kiva: Create Results Data Kiva(s)
    Config→Kiva: Create Virtual Network Segments
    activate Kiva
    B→Kiva: Receive Source Data
    note over Kiva: Expose source data to Process Kiva
    note over Kiva: Execute analysis processes
    note over Kiva: Filter/Redact Result Data
    note over Kiva: Deposit Result Data in Outbox
    Kiva→B: Send DataSet Usage Metering/Billing information.
    B→Kiva: Approval to release results.
    Kiva→B: Transfer Result Data to Customer
    note over Kiva: Destroy all Kivas, Gateways and Virtual network segments
    deactivate Kiva
    Kiva→Config: Analysis Complete
    destroy Kiva FIG. 19 Assembly Diagram FIG. 19 depicts a method 1900 that is used by a particular implementation that takes input information from multiple data participants (e.g., 403, 405, 507, and/or 509 of FIGS. 4 and 5), and transforms that into a group of inter-related assembly-plans 1913, e.g., as illustrated by reference to Kiva contract-assembly 1999. The assembly-plans 1913 are automatically executed by a Kiva system-configurator to implement a Kiva system-contract (e.g., see FIGS. 7-8). This input information includes: Dataset Identifiers and/or descriptors 1910, Process Identifiers and/or Descriptors 1915, Process-Data flow description 1920, Output-Constraints 1925, e.g., redactions and/or anonymizations, and/or Other Policies 1930, e.g., transaction policies, metering, and/or audit policies.

The dataset identifiers and/or descriptors 1910 of these embodiments include descriptions about what data sources are for use, and which subsets of that data are selected. The process identifiers and/or descriptors 1915 include the selection and/or configuration of the specific processes that are used to manipulate and analyze the source data to produce a new or derivative data set. The process-data flow description 1920 includes a graphical depiction of the flow of the data from the data-sources, through the various processing steps and policies, ending in the results-dataset. The output-constraints 1925 include a description of the necessary filtering, redaction, and anonymization policies that are agreed to by the owner and/or seller of source-data, and the recipients and/or buyers of results-data. The other policies 1930 include audit policies that determine the compliance of the execution of the transaction with the original contract, metering policies which define what aspects of the transaction need to be measured and metered, and other transaction policies such as data validation policies that determine the validity of individual data records based on age of data and scope.

The foregoing are input to a Kiva system-designer user interface (UI) 1927 which outputs one or more Assembly-Plans 1913. These Assembly-Plans 1913 include system-parameters which incorporate the requirements of the system-participants and are implemented upon generation and/or instantiation of the system of the various described embodiments herein. More than one Assembly-Plan 1913 may be required to fully implement a more complete and/or a full contract-assembly 1999. The system-designer user interface 1927 of some embodiments is further described in relation to FIGS. 21-22. Some of these implementations of the system-designer user interface 1927 provide inputs to the system-configurator 1527 of FIG. 15.

Within the example of FIG. 19, the assembly-plan 1913 embodies or includes datasets 1910, processes 1915, output constraints 1925, and other policies 1930, which are interconnected according to process and/or data flow 1920. The Kiva contract-assembly 1999 is a collection of assembly-plans 1913 required to fulfill the intended outcome of a specific Kiva Contract. In some embodiments, the assembly-plans 1913 and/or the Kiva contract-assembly 1999 are similar or substantially the same as the as the assembly-plans 713 and/or the Kiva contract-assembly 799 of FIG. 7.

As described previously, one or more Assembly-Plans 1913 with the assembly 1999 of FIG. 19, is used to generate and/or instantiate all of the system-components and/or system-elements of a system 100 . . . x00. The operation of some of these instantiated systems 100 . . . x00 is further described next in relation to FIG. 20.

Figure 20:
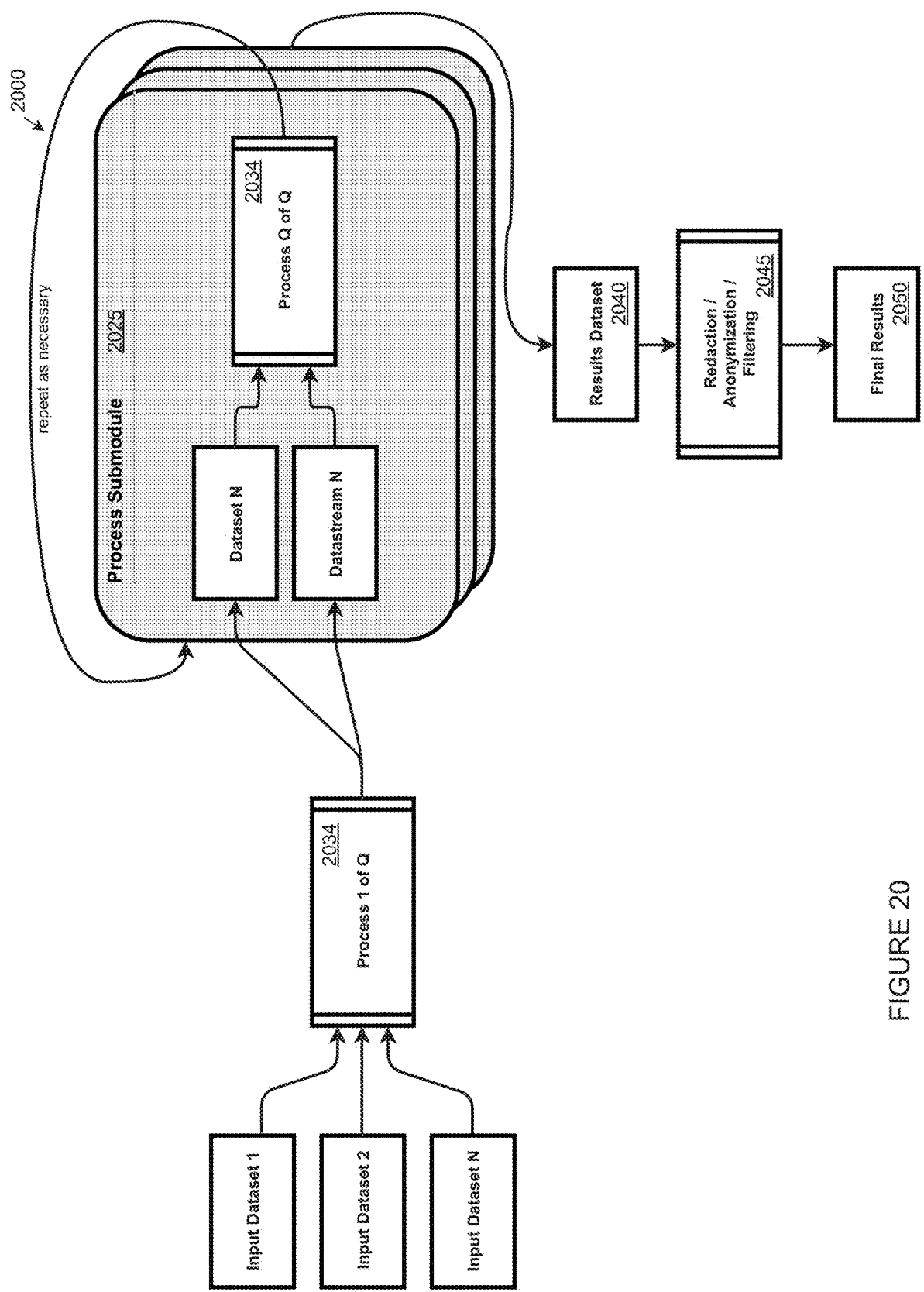
FIG. 20 depicts an instantiated system in operation.

FIG. 20 Data Flow through the Process(es) of an Instantiated System in Operation FIG. 20 depicts a more detailed description of an instantiated system 2000 in operation. As shown in this figure, the instantiated system 2000 includes one or more input-datasets (1 to N), one or more processes 2034 (1 to Q processes), one or more process-submodules 2025, at least one results-dataset 2040, filtering 2045, and at least one final-results 2050. The processes 2034 are further described in relation to FIG. 6.

Prior to instantiation of the system 2000, the system-components, including the process-submodule 2025, for the system 2000 were defined. For instance, within FIG. 19, the (descriptor, constraints, and/or policies, etc.) blocks 1910, 1915, 1920, 1925, and/or 1930 of FIG. 19 of an assembly 1999 for FIG. 19, was configured, and subsequently translated and instantiated into a collection of interconnected specific modules and/or submodules by using the system-assembly plans 1913 of the assembly 1999. In an implementation case, the submodules instantiated by the method 1900 of FIG. 19 includes the process-submodules 2025, and/or the processes 2034, of FIG. 20. Moreover, the processes 2034 and/or process-submodules 2025 of some embodiments are similar or substantially the same as the system-submodules 1325 of FIG. 13. Stated differently, the submodules 2025 may be constructed, generated and/or instantiated by using the building-blocks and/or methods described in relation to FIGS. 9 through 13.

As shown in FIG. 20, input-datasets (up to N) are selectively provided to one or more processes 2034 (up to Q) of each process-submodule 2025, for processing. Such processing may iterate through a single and/or the same process-submodule 2025 and/or multiple different process-submodules 2025. The processing of the instantiated system 2000 preferably yields a results-dataset 2040.

Within the implementation 2000 of FIG. 20, the instantiated system 2000 is configured for multiple potential data-sources (from 1 to N datasets). Some or all of the multiple datasets may be made available from a single source-data device/participant, or the datasets are made available from many different source-data devices/participants, collectively, for example. Some embodiments use or re-use a pre-existing and/or defined Kiva assembly-plan 1913 of FIG. 19, as a sub-component (sub-assembly) of a separate Kiva assembly-plan, requiring the use of multiple process-submodules 2025. The assembly plan 1913 of some embodiments use looping or recursive structures within the assembly plan to generate a more complex assembly, thus requiring the use of the looping, recursive connection shown in processing-submodule 2025. FIG. 20 also illustrates the enforcement of agreed anonymization, redaction and/or another type of filtering by the filter 2045, after the results-dataset 2040 is generated, and before any derived data may escape out of the instantiated system 2000, e.g., when final-results 2050 are made available or provided.

Figure 21:
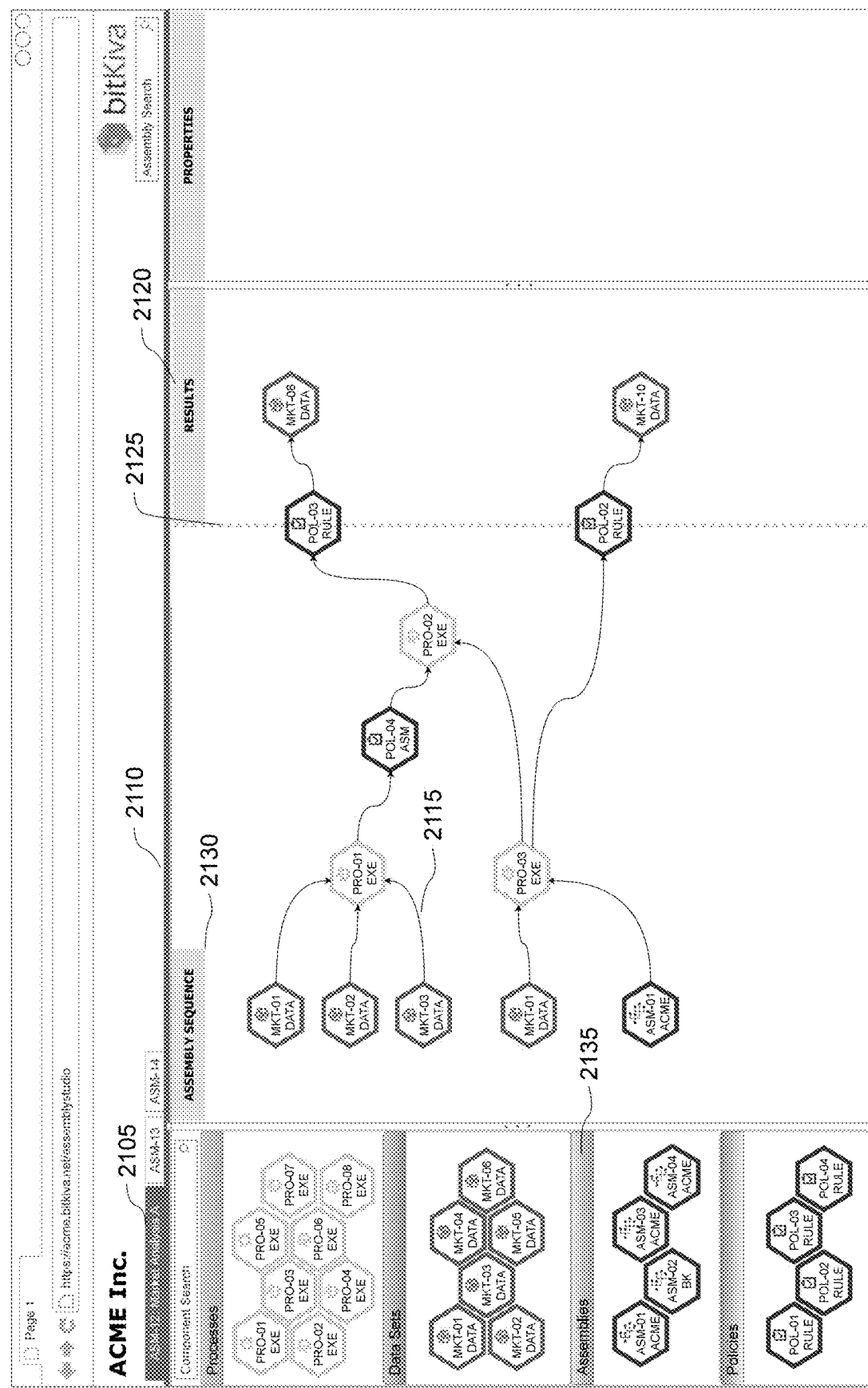
FIG. 21 shows a snapshot of a graphical user interface (GUI) as a user provides inputs whereby a system-configurator for the graphical user interface generates an assembly sequence.
Figure 22:
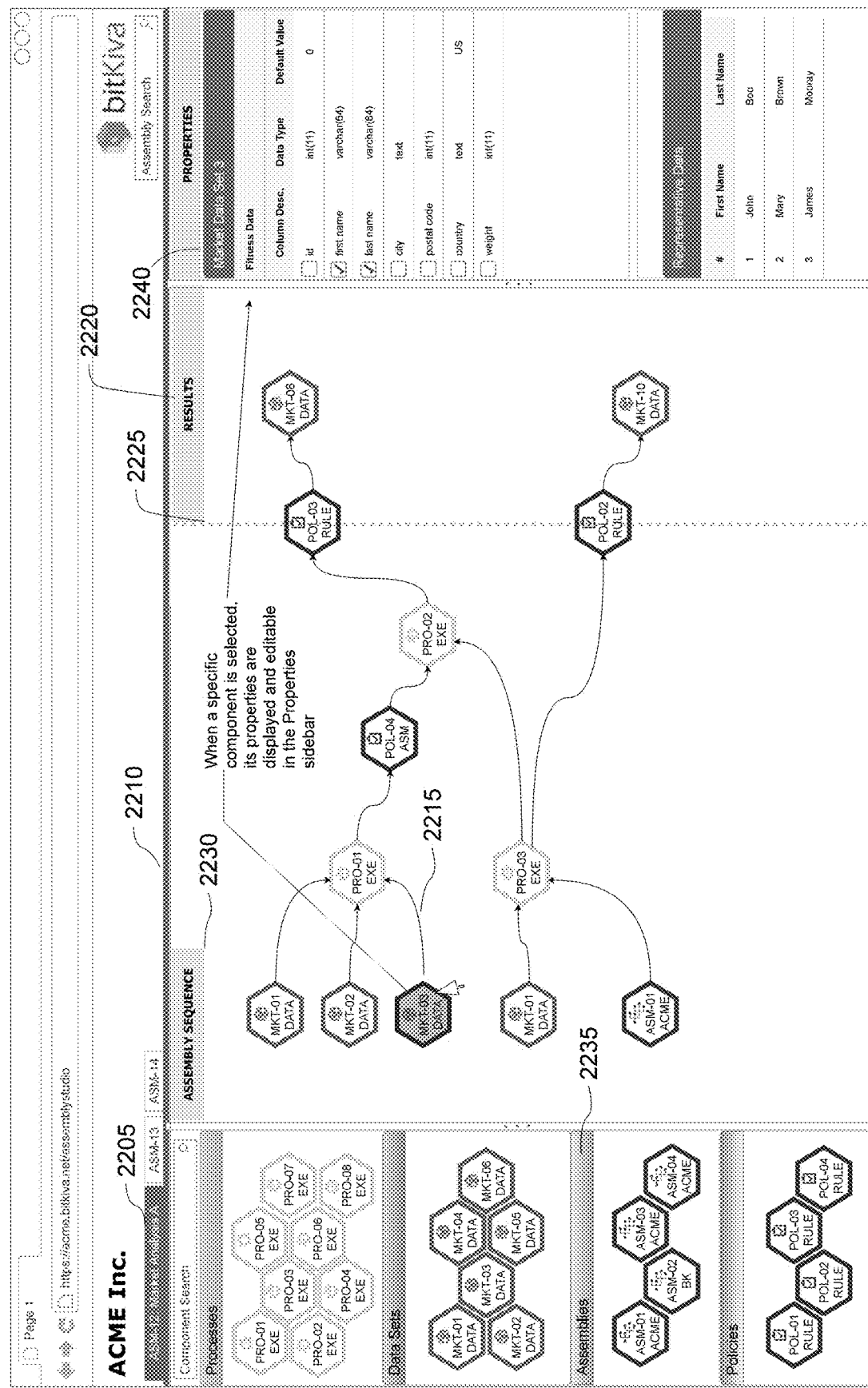
FIG. 22 shows an example of how detailed parameters describing each specific component are entered by using the graphical user interface of an embodiment.

FIGS. 21-22 User Interface in accordance with some embodiments.

FIGS. 21 and 22 illustrate examples of how a graphical-type user interface provides the ability for users to access the options listed above.

FIG. 21 for instance shows a user interface 2100 that enables the gathering of input information from participants and/or parties to a system. In general, the required input information that is indicated by the input-boxes on the left side of FIG. 21, is gathered when the partners interact with the graphical depiction of the intended data-flow as seen in FIG. 21, e.g., by adding, moving, deleting, and connecting the necessary elements. Each element when highlighted, displays the required details needed for that specific type of element (data, process or policy), and allows the user to input, edit or delete information as necessary. Once all of that input has been gathered by the user interface 2100, the Kiva platform (see e.g., FIG. 15) "compiles" that information to generate an assembly-plan (see e.g., FIGS. 7-8) that is then used to determine how many and what kind of Kiva system-components and/or elements need to be instantiated, the network-topology (including virtual-networks, in some cases) that must be used to couple the Kiva system-components and/or system-elements, the sequencing that may be required for the data to flow through the system-modules and/or system-submodules correctly, and the filtering or redaction that must be done before depositing the data into the results-dataset (e.g., of the results-module and/or the data-output modules and/or submodules). This assembly-plan of an embodiment may then be automatically executed, the Kiva system-modules and/or submodules may be generated, the entire data flow executed and the derived dataset generated, and then all of the system, the modules, and/or submodules may then be destroyed.

Once an assembly-plan is saved it becomes the template used for a project's execution. The data for the project is sourced from single or multiple data providers (each with its own Kiva contract). Information from the assembly-plan, as well as from the Kiva contract(s) enables determinations for the actual array of Kiva system-elements that need to be generated and/or instantiated, and later disassembled and/or destroyed.

FIGS. 21 and 22 depict a graphical user interface (GUI) 2100 and 2200 respectively, for the system of some embodiments, such as the system 100 of FIG. 1. As shown in FIG. 21, the user interface 2100 is configured to receive parameters that are saved inside one or more assembly plans that may comprise a Kiva System-Contract (e.g., contract-assembly 1999 of FIG. 19). As described, the system assembly-plans (see e.g., FIGS. 7-8, and 19-20) are passed to Kiva System-Configurator (see e.g., FIG. 15), which then automatically instantiates, generates and/or assembles one or more Kiva system environment (e.g., system 100 of FIG. 1 or the systems of the other figures referenced herein).

One particular parameter of the system assembly-plan is the Assembly-Sequence 2130, which describes how the various system-components needed for the Kiva system-contract are coupled together, and how the data needs to flow through those system-components from data-source to data-results participant device(s).

The assembly-sequence 2130 shown in this snapshot of a GUI 2100 is saved as an assembly-unit (black hexagons) within the groups of a palette 2105. The assembly-units within the palette 2135 may then used in a different assembly-plan as a sub-assembly.

As a user provides inputs to the graphical user interface 2100, a system-configurator for the user interface 2100 generates a representation of an assembly-sequence 2130 and presents the representation within a canvas area 2110. The user selects various components from the palettes 2105 on the left hand side of the screen, by clicking and/or dragging hexagons that represent system components including: Processes, Data Sets, Policies, or other pre-made and/or pre-configured assembly sequences that are advantageously reused to generate new assembly-sequences 2130. These system-components are described in detail herein. These system-components are dragged to the canvas 2110 in the middle of the screen, where they are moved around, and coupled to each other with arrow lines 2115 that depict the flow of data between these system-components. To complete an assembly-sequence within the canvas 2110, data must enter into the Results-zone 2120 on the right side of the canvas 2110, passing through at least one policy-hexagon (e.g., POL-03 RULE and/or POL-02 RULE) that sits on the border 2125 of the Results-zone 2120 and the result of the assembly-sequence 2130 within the canvas 2110. Once an assembly-sequence 2130 has been completed, the entire constructed assembly-sequence 2130 within the canvas 2110 (including the policies of the border 2125 and/or the results-zone 2120 with connections and directional-arrows depicted in the user interface 2100) may be saved as its own hexagon-shape, into the "assemblies"-palette 2135, and reused in this or a future project. Previous assembly-sequences saved within the assemblies-palette 2135 include, for example: "ASM-01 ACME," "ASM-02 ACME," . . . .

By using the catalog and industry model as referred to in FIG. 8, domain or industry specific groups of assemblies may populate the assemblies palette, thereby enabling a user to quickly and easily assemble a data interaction relevant to his intended business use case.

FIG. 22 shows an example of how detailed parameters describing each specific system-component may be entered by using the graphical user interface 2200 of an embodiment. As shown in this figure, when a hexagon representing a specific system-component is clicked, a context-menu 2240 is opened on the right side of the GUI screen 2200 allowing more detailed information to be entered about how that specific component may be used. In this example, the user has clicked on a source-data hexagon "MKT-03." A context-menu 2240 for this source dataset MKT-03 then appears on the right side panel and identifies this system-component MKT-03 more specifically as "Market Data Set 3." In this context-menu 2240, the metadata (Properties) that describes the various columns of data that are in this data set are displayed with checkboxes, so that the user may select which subset of data shall flow through from this hexagon MKT-03 through the arrow line 2215 to the next component (PRO-01 EXE). At the bottom of this context-menu 2240, some "Representative Data" is displayed to the user. In implementation, the "Representative Data" comprises sample data and not the real data, but "dummy" sample data that shows the types of values that the user may expect to be within this data set. The simulated or sample data is shown so that the user may better understand what the data coming from this data source (MKT-03) may look like, and so that the user is enabled to then configure downstream system components and to thereby properly manipulate or filter this selected data.

Advantages

The digital transformation of modern technology has created a whole new generation of digitization-driven, market dominant, hyper-growth giants. These companies include, for instance, Social, Mobile, Analytics, Cloud, Internet of Things (SMACIT) companies.

The value that a multi-sided platform of some embodiments provides to its consumers is related to the number of total participants that are operatively coupled to a platform or system described herein. Therefore, a platform or system that reaches a critical mass of participants further provides advantages to new participants who join the platform. In markets that have not been transformed to this multi-sided platform or system, there are advantages to initiate and provide a multi-sided platform.

One of the goals of some embodiments is to provide digitization and further to aggregate available sources of data into a high-value, proprietary dataset. In a traditional context, an enterprise having accomplished the generation of this valuable dataset, is faced with a dilemma: the asset is now so valuable, and such a core component of enterprise differentiation, that any use of the asset that involves outside partners becomes inherently higher-risk, and must be approached accordingly with great caution, expense and/or controls. In addition, there are often legal constraints that are imposed on segments of the dataset that are dictated by the manner in which it was collected, e.g., end-user privacy agreements.

The net result is that the potential exposure and usage of internal data in a data partnership environment is often met with a natural reluctance that manifests itself in either deliberately slow execution, and/or sky-high pricing, which are both ways of counteracting the level of risk. This often means that core data assets end up 'siloed' away from other enterprises, and unable to be used in the creation of new valuable combinations.

The embodiments disclosed herein solve the foregoing problems by advantageously providing isolated and/or quarantined zones in which data and/or processes from multiple data participants/partners interact without data leakage between data participants/partners.

For instance, some embodiments implement multi-directional policies on data flows and process operations and/or provide data Neutral Zone(s), thereby providing B2B secure data and process operations.

The embodiments disclosed herein are not limited to inter-enterprise participants data interactions, but may further include data interactions involving inter-departmental participants such as within a single entity.

Some disclosed embodiments function as a trusted, third-party data escrow service, providing a cloud-based data partnership platform architected to address the emerging demand for inter-enterprise data partnerships. These embodiments provide and perform collaborative digital services, and further provide: the ability to handle data from multiple participants and/or partners in a source-isolated, non-shared, auditable manner thereby protecting both data and processes; and further providing the ability to deploy services to leverage this data while maintaining the separation between data sources. The foregoing separation or isolation advantageously eliminates potential data cross contamination and associated liability.

These capabilities, encoded into and/or by the embodiments herein, are the basis of a turnkey solution that interconnects multiple, siloed digital sources and/or recipients. Some embodiments include one or more marketplace(s) and service management tools. These allow data providers and/or data consumers to quickly instantiate and manage new digital partner ecosystems, with minimal need for specialized, e.g., information technology (IT) department resources and attention. While conventional intra-enterprise digitization creates silos of data and apps within businesses, the disclosed embodiments integrate these digital silos to enable inter-enterprise collaboration.

The embodiments disclosed herein allow enterprises to extract the value from their digitized proprietary data assets by leveraging partnerships with other entities, while mitigating the risks of allowing these externally facing data relationships. Some embodiments allow for a novel syndicated data paradigm. Instead of difficult to negotiate, high-risk, high-value full dataset sharing agreements, some disclosed architectures enable a new category of fine-grained, "pay-by-the-sip," shared value micro-transactions. This provides a new, low-risk, shared value model that incentivizes proprietary dataset owners to participate in new innovative "mash-up" services, while shrinking time to implementation of these services. The solution of the disclosed embodiments accelerates time-to-market. By utilizing a containerized, micro-kernel based approach, the disclosed embodiments allow the immediate migration of existing legacy applications into a cloud-deployed partnership context, thus allowing the initial deployment of new services in a matter of weeks or months rather than years. Particular embodiments provide a turnkey service. With a full suite of front-end marketplace, management, and monitoring tools, selected embodiments enable the launch of collaborative services with minimal initial or ongoing resource requirements from IT departments. One of ordinary skill recognize this has cost and efficiency benefits.

In a typical traditional data transaction, e.g. a data partnership, one partner transmits its proprietary data to the second partner. Secure Data Transport solutions are often used to prevent the breach of the data during this transfer, but unfortunately these solutions do not extend to the endpoints.

Within some of the disclose embodiments, data are advantageously delivered by one-way transmission links. These links are designed such that data are not and/or cannot be delivered back to any of the participating data-partners. Once the data has been transported, it is contained in a network and process isolated and/or quarantined zone The foregoing was described in relation to the modules and/or submodules of certain implementations.

Once data participants/partners have transmitted their source data into one or more data-Kiva modules and/or submodules, that data is optionally cross-correlated, analyzed, or consumed by one or more processes that are running in a linked process-Kiva module and/or submodule. The algorithms implemented by the process-Kiva module and/or submodule have access to the data from multiple sources in the associated data-Kiva module and/or submodule, however, the process-Kiva is also in an isolated and/or quarantined area, and has strict limitations on its communication links to the outside world (external to the process-Kiva module and/or submodule), as well as stringent pre-configured data-filters that only allow specific derived data to be sent on outward bound links.

Over the last few years there has been increasing focus on the issue of sharing, management, and security of personally identifiable end user data. The general public, consumers, and regulators have heightened privacy concerns and issues with user data including personally identifiable information (PII). For instance recent events include:
   Misuse of user privacy data at Cambridge Analytica through partnership with Facebook in 2016;
   Massive user privacy data breach at Equifax in 2017;
   User privacy data breach at Facebook in 2018;
   The EU's new General Data Protection regulations that went into effect in 2018.

A fundamental problem behind all of these events is that many business entities collect personal information about end users, and want to extract valuable analysis and/or implement personalized services based on that data, however, there have been very few solutions to the issue of how to safeguard that data from unwanted, or even illegal usage by non-authorized parties, while still enabling valid uses.

This problem is especially exacerbated when two or more different entities are involved, since, as we described above, the typical practice is for one data-partner to give their data to a second partner, and rely upon negotiated contracts to govern the second data-partner's treatment of the data.

Embodiments described herein advantageously provide the ability to isolate source data, and do not allow source data to be transmitted to other data participants/partners, while still allowing cross dataset analysis as well as services to be implemented that leverage that data. These embodiments address personal data concerns, by preventing the leakage of these data between multiple data-partners, thus eliminating an entire category of personal data leakage and breach issues. In addition, some embodiments provide a central control point through which processes that are operating upon the data must run through to thereby provide a complete, auditable record of what operations or services were performed in conjunction with any particular personal data set. For instance, the ability to produce an auditable record provides the ability to demonstrate compliance with relevant regulations.

Traditional methodology for data-partnerships undesirably relies upon the transmission of source data to the participating data-partner(s). These traditional methods suffer from security, regulatory, privacy, liability and proprietary trade secret concerns, as well as impose a significant amount of pre-partnership legal negotiation time and cost as well as integration effort. By contrast the novel architectures described herein give the ability to provide a tightly-controlled, source-data isolated environment that allows analysis and services to be run on multiple data sets from multiple sources, while ensuring that there is no cross-contamination of data and/or no undesirable data-leakage from one data-participant to another.

While various example embodiments of the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A machine implemented system for data, the system comprising:
   a data module for storing data received from an external source, the data module further comprising:
   a file system for unstructured data;
   a database for structured data;
   a transform for operations upon unstructured or structured data;

a data broker for receiving data having a first format and providing the data in a second format;

a data network for communications within the data module; and a processing module for performing operations upon data, the processing module further comprising:

a process broker;

a process container for providing one or more instances of processes in operation;

an interprocess network for communications within the processing module;

an internal gateway for the data module to communicate with the processing module;

wherein one or more elements of the system comprises an instantiation, the instantiation further comprising, a building block further comprising: a router subnet, a component subnet, and a router container, the router container comprising: a programming and/or messaging framework (MT), a basic router (RT), a logging framework (LF), a plugin framework (PF), a rules engine (RE), and a configuration-storage (CS);

wherein the elements of the system are instantiated by a configurator, the configurator for storing instructions for replication of results-data, without actually storing the results-data;

wherein an output of the processing module comprises the results-data.

2. The system of claim 1, further comprising:

an external gateway coupled to the data module, the external gateway for receiving data from an external source;

an isolated-type data-network for allowing communications between elements of the data module;

a process network for allowing communications between elements of the process module; and a filter for filtering results output by the process module.

3. The system of claim 1, further comprising:

a virtual machine implementation; and a container implementation;

wherein the container implementation comprises a building block for instantiating one or more system elements, the system elements comprising: a gateway, a router, a firewall, an isolated network, a subnet, a proxy, a network protocol element, a process module, a transform, a file system, a database, a broker, or a filter;

wherein the virtual machine implementation comprises a plurality of container implementations.

4. The system of claim 1, wherein one or more data modules and one or more process modules are isolated from each other by using one or more gateways and one or more networks, the networks comprising a plurality of network elements comprising: a router, a router subnet, a component subnet;

wherein the router is implemented by using a container implementation.

5. The system of claim 1, wherein an isolated network comprises a plurality of containers and one or more subnets; the system further configured for on-demand dynamic instantiation and/or destruction of one or more modules and/or submodules, thereby having an adjustable attack window such that the system and/or data for the system are only accessible during a time window after instantiation and before destruction of the system; wherein a configurator for the system only keeps a record of a system-instantiation recipe for the instantiation and/or destruction of the instantiation of the system, such that a system instantiation is selectively replicated and/or iterated even after the system is no longer instantiated or has been destroyed, the system-instantiation recipe comprising a set of instructions allowing for the replication of a specific set of previously generated results without actually storing the previously generated results.

6. A method of isolating data, the method comprising:

receiving from a first entity, a first data set;

storing the first data set by using a first data module;

providing by using an internal gateway the first data set to a first process module;

processing the first data set by using the first process module thereby generating a second data set, the second data set comprising the result of processing the first data set;

providing by using the internal gateway the second data set to a second data module, wherein the internal gateway is required for communication between the first data module and the first process module;

instantiating an implementation for each of: a gateway, a router, a firewall, an isolated network, a subnet, a proxy, a network protocol element, a process module, a transform, a file system, a database, a broker, and a filter;

instantiating and/or destroying dynamically on-demand an implementation of one or more modules and/or submodules for the processing, thereby having an adjustable attack window such that one or more of the modules, submodules, processes and/or data for the processing are only accessible during a time window after instantiation and before destruction of the one or more modules, submodules, processes and/or data for the processing; and implementing each instantiation, by using a building block comprising: a router subnet, a component subnet, and a router container comprising of: a programming and/or messaging framework (MT), a basic router (RT), a logging framework (LF), a plugin framework (PF), a rules engine (RE), and a configuration-storage (CS);

keeping only an instantiation-recipe for the instantiation and/or destruction of the modules, submodules, processes and/or data, such that a processing and/or result of processing is selectively replicated and/or iterated even after the modules, submodules, processes and/or data are no longer instantiated or have been destroyed, the instantiation-recipe comprising a set of instructions allowing for the replication of a specific set of previously generated processes and/or results-data without actually storing the previously generated processes and/or results-data;

wherein the second data set comprises the results-data.

7. The method of claim 6, further comprising:

communicating within the first data module by using a first data network; and preventing by using the first data network, communication between objects internal to the first data network and objects external to the first data network.

8. The method of claim 6, further comprising:

using an external gateway for the receiving from the first entity;

providing by using the external gateway the first data set to a second entity, such that the first entity and the second entity are not required to be simultaneously coupled to the external gateway at any point in time.

9. The method of claim 6, further comprising:
providing the first data set to a second entity without the need for the first entity and the second entity to be coupled directly to each other.

10. The method of claim 6, wherein the receiving of the first data set is in real-time.

11. The method of claim 6, wherein the receiving of the first data set is off-line and/or in batch mode.

12. The method of claim 6, further comprising:
by using a container implementation within a virtual machine, instantiating one or more of: a gateway, a router, a firewall, an isolated network, a subnet, a proxy, a network protocol element, a process module, a transform, a file system, a database, a broker, or a filter.

13. The method of claim 6, further comprising:
wherein one or more data modules and one or more process modules are isolated from each other by using one or more gateways and one or more networks, the networks comprising a plurality of network elements comprising: a router, a router subnet, a component subnet;
wherein the router is implemented by using a container implementation.

14. The method of claim 6, wherein an isolated network comprises a plurality of containers and one or more subnets;
wherein a container is implemented separately and without the use of a virtual machine.

15. The method of claim 6, further comprising: providing, to a user, an element of the second data set.

16. The method of claim 6, wherein the first entity has different access to the second data set than to the first data set thereby providing isolated data for the second data set.

17. The method of claim 6, wherein the processing is performed outside the view and/or access of the first entity thereby providing isolated processing.

18. The method of claim 6, the processing comprising transforming the data;
the transforming by using one or more of an executable application, a function, a gateway, a router, a firewall, an isolated network, a subnet, a proxy, a network protocol element, a process module, a transform, a sort, a file system, a database, a broker, a filter, an HTTP Interceptor, FTP Interceptor, AQMP Interceptor, Socket Proxy Container, JDBC Proxy, Firewall, API Gateway, JMS Interceptor, MQTT Interceptor, CIFS Proxy.

19. The method of claim 6, further comprising:
storing the first data set by using a first data module;
analyzing the first data set;
the first data set further comprising a first data element;
the first data element having a first feature that is useable to identify an entity associated with the first data element;
the first data element comprising personally identifiable information, comprising one or more of: name, address, an identification number, an attribute, trait, or characteristic associated with an entity;
separating a first feature from a first data element such that the first feature is not useable to identify an entity associated with the first data element;
the analyzing comprising a mosaic effect analysis;
the processing comprising one or more of: storing, retrieving, analyzing, filtering, sorting, transforming, and anonymizing.

20. A method of processing data, the method comprising:
receiving a first data set from a first source;
receiving, independently of the first source, a second data set from a second source such that the second source has different access to the first data set than the first source;
processing the first data set;
processing the second data set;
generating a third data set comprising the processing of the first data set and the second data set;
providing the third data set to the second source, such that the second source has access to the third data set without the need to access the first data set;
providing, to a user, an element of the third data set;
wherein the different access comprises: the second source has no access to the first data set and/or the first source thereby providing isolated data, wherein the processing is performed outside the view and/or access of the second source thereby providing isolated processing; and
by using a container-type implementation within a virtual machine, instantiating one or more virtualizations of: a gateway, a router, a firewall, an isolated network, a subnet, a proxy, a network protocol element, a process module, a transform, a file system, a database, a broker, or a filter;
instantiating and/or destroying dynamically on-demand by using an implementation of one or more modules and/or submodules for the processing, thereby having an adjustable attack window such that one or more of the modules, submodules, processes and/or data for the processing are only accessible during a time window after instantiation and before destruction of the one or more modules, submodules, processes and/or data for the processing;
to implement each instantiation, using a building block comprising: a router subnet, a component subnet, and a router container, the router container comprising of: a programming and/or messaging framework (MT), a basic router (RT), a logging framework (LF), a plugin framework (PF), a rules engine (RE), and a configuration-storage (CS); and
keeping only an instantiation-recipe for the instantiation and/or destruction of the modules, submodules, processes and/or data, such that a processing and/or result of processing is selectively replicated and/or iterated even after the modules, submodules, processes and/or results-data are no longer instantiated or have been destroyed, the instantiation-recipe comprising a set of instructions allowing for the replication of a specific set of previously generated processes and/or results-data without actually storing the previously generated processes and/or results-data;
wherein the third data set comprises the results-data.

* * * * *